US012542363B2

(12) United States Patent
Pandey et al.

(10) Patent No.: US 12,542,363 B2
(45) Date of Patent: Feb. 3, 2026

(54) MINIATURIZED ANTENNA

(71) Applicant: ROGERS CORPORATION, Chandler, AZ (US)

(72) Inventors: Shailesh Pandey, Woburn, MA (US); Yajie Chen, Brighton, MA (US); Lance Young, Shrewsbury, MA (US); Kristi Pance, Auburndale, MA (US); Lori Brock, Ipswich, MA (US)

(73) Assignee: ROGERS CORPORATION, Chandler, AZ (US)

( * ) Notice: Subject to any disclaimer, the term of this patent is extended or adjusted under 35 U.S.C. 154(b) by 216 days.

(21) Appl. No.: 18/234,307

(22) Filed: Aug. 15, 2023

(65) Prior Publication Data

US 2024/0063545 A1 Feb. 22, 2024

Related U.S. Application Data

(60) Provisional application No. 63/398,375, filed on Aug. 16, 2022.

(51) Int. Cl.
*H01Q 1/22* (2006.01)
*H01Q 9/04* (2006.01)

(52) U.S. Cl.
CPC ............. *H01Q 9/0421* (2013.01); *H01Q 1/22* (2013.01)

(58) Field of Classification Search
CPC ...... H01Q 9/0421; H01Q 1/22; H01Q 9/0407; H01Q 1/38
See application file for complete search history.

(56) References Cited

U.S. PATENT DOCUMENTS

| | | | | |
|---|---|---|---|---|
| 10,170,838 | B2 * | 1/2019 | Garcia | H01Q 1/38 |
| 2007/0241971 | A1 * | 10/2007 | Tsujimura | H01Q 9/0421 343/702 |
| 2008/0024381 | A1 * | 1/2008 | Vendik | H01Q 7/00 343/822 |
| 2008/0180333 | A1 * | 7/2008 | Martiskainen | H01Q 1/38 343/722 |
| 2012/0038531 | A1 * | 2/2012 | Lee | H01Q 1/38 29/600 |
| 2014/0320365 | A1 * | 10/2014 | Hong | H01Q 1/38 343/787 |
| 2016/0276072 | A1 * | 9/2016 | Sethumadhavan | H01F 1/37 |
| 2021/0194143 | A1 * | 6/2021 | Ahadi | H01Q 1/38 |
| 2021/0246046 | A1 * | 8/2021 | Chen | C04B 35/6262 |

* cited by examiner

*Primary Examiner* — Dameon E Levi
*Assistant Examiner* — Michael M Bouizza
(74) *Attorney, Agent, or Firm* — CANTOR COLBURN LLP

(57) ABSTRACT

An antenna includes a substrate and an electromagnetic, EM, radiator. The substrate includes a magnetodielectric material. The EM radiator includes an electrically conductive material disposed on an upper surface of the substrate. The EM radiator further includes a root, and a pair of forks that are contiguous with and extend from the root along a first axis. The pair of forks are separated from one another by a slot in the electrically conductive material of the EM radiator to define a fork-shaped EM radiator. The root includes a bridge portion extending between the pair of forks in a direction of a second axis perpendicular to the first axis to electrically connect together the pair of forks.

17 Claims, 22 Drawing Sheets

250

| Substrate - B | |
|---|---|
| ε,μ | 8.7,1.7 |
| tanδ, tanμ | 0.005,0.06 |
| Miniaturization Factor | 14.79 |

252

| Variables | Dim. |
|---|---|
| Subx | 27 mm |
| Suby | 9 mm |
| $ForkRoot_L$ | 3 mm |
| $Fork_L$ | 24 mm |
| $Fork_W$ | 1.5 mm |
| $Slot_W$ | 2 mm |
| $Slot_L$ | 21 mm |
| $P_x$ | 1.5 mm |
| $P_y$ | 4.5 mm |

254

| Variables | Dimensions |
|---|---|
| Grdx | 51 mm |
| Grdy | 26 mm |
| GrdCprx | 17 mm |
| Rootx | 12.0 mm |
| Rooty | 8.5 mm |

260

| Substrate B: Achieved electrical specification (Single Band) | |
|---|---|
| Frequency Range (-10dB) | 2.26-2.7 GHz |
| Peak Gain | 1.18 dBi |
| Efficiency | 76-81% (Max. 88%) |
| Polarization | Linear |
| Achieved mechanical specification | |
| Dimension (X x Y) | 27.0 mm x 9.0 mm |
| Interface | Coax Feed |
| Ground Plane | N/A |

*FIG. 11*

| Substrate - C | |
|---|---|
| ε,μ | 14,1.9 |
| tanδ, tanμ | 0.06,0.04 |
| Miniaturization Factor | 26.6 |

452

| Variables | Dimensions |
|---|---|
| Subx | 24 mm |
| Suby | 6 mm |
| $ForkRoot_L$ | 6 mm |
| $Fork_L$ | 18 mm |
| $Fork_W$ | 1 mm |
| $Slot_W$ | 1.5 mm |
| $Slot_L$ | 20 mm |
| $P_x$ | 1 mm |
| $P_y$ | 3 mm |

| Variables | Dimensions |
|---|---|
| Grdx | 51 mm |
| Grdy | 26 mm |
| GrdCprx | 17 mm |
| Rootx | 13.5 mm |
| Rooty | 10 mm |

454

460

| Substrate C: Achieved electrical specification (Single Band) | |
|---|---|
| Frequency Range (-10dB) | 2.32-2.75 GHz |
| Peak Gain | 0.85 dBi |
| Efficiency | 72-82% (Max. 82%) |
| Polarization | Linear |
| Achieved mechanical specification | |
| Dimension (X x Y) | 24.0 mm x 6.0 mm |
| Interface | Coax Feed |
| Ground Plane | N/A |

*FIG. 18*

510

| | 18H ferrite substrate - 2.4 GHz | | | |
|---|---|---|---|---|
| Material Code | μ' | μ"/μ' | ε' | ε"/ε' |
| Substrate C | 1.80 | 0.0378 | 14.4 | 0.006 |
| Substrate B | 1.63 | 0.0429 | 8.86 | 0.002 |

*FIG. 24*

MINIATURIZED ANTENNA

CROSS REFERENCE TO RELATED APPLICATIONS

This application claims the benefit of U.S. Provisional Application Ser. No. 63/398,375, filed on Aug. 16, 2022, which is incorporated herein by reference in its entirety.

BACKGROUND

The present disclosure relates generally to antennas, and more particularly, a miniaturized fork-shaped patch antenna including magnetic materials.

Improved performance and miniaturization are needed to meet the ever-increasing demands of devices used in very high frequency applications, which are of particular interest in a variety of commercial and defense related industries. As an important component in radar and modern wireless communication systems, antenna elements with compact sizes are constantly being developed. It has been challenging, however, to develop ferrite materials for use in such high frequency applications as most ferrite materials exhibit relatively high magnetic loss at high frequencies. Accordingly, and while existing antennas may be suitable for their intended purpose, the art of antennas would be advanced with features enabling miniaturization thereof.

BRIEF SUMMARY

One or more non-limiting embodiments described herein provide a miniaturized fork-shaped patch antenna as defined by the appended independent claims. Further advantageous modifications of the miniaturized antenna according to various non-limiting embodiments are defined by the appended dependent claims.

According to a non-limiting embodiment, an antenna includes a substrate and an electromagnetic (EM) radiator. The substrate includes a magnetodielectric material. The EM radiator includes an electrically conductive material disposed on an upper surface of the substrate. The EM radiator further includes a root, and a pair of forks that are contiguous with and extend from the root along a first axis. The pair of forks are separated from one another by a slot in the electrically conductive material of the EM radiator to define a fork-shaped EM radiator. The root includes a bridge portion extending between the pair of forks in a direction of a second axis perpendicular to the first axis to electrically connect together the pair of forks.

According to another non-limiting embodiment, an antenna assembly comprises an antenna and a host board. The antenna comprises a substrate and an electromagnetic, EM, radiator. The substrate includes a magnetodielectric material. The EM radiator includes an electrically conductive material disposed on an upper surface of the substrate. The EM radiator further includes a root, and a pair of forks that are contiguous with and extend from the root along a first axis. The pair of forks are separated from one another by a slot in the electrically conductive material of the EM radiator to define a fork-shaped EM radiator. The root includes a bridge portion extending between the pair of forks in a direction of a second axis perpendicular to the first axis to electrically connect together the pair of forks. The host board comprises a dielectric layer including an upper dielectric surface and a lower dielectric surface located opposite the upper dielectric surface. A top metal layer is disposed on and bonded to a portion of the upper dielectric layer, and a bottom metal layer disposed on and bonded to the lower dielectric surface. A region of the host board excluding the top metal layer defines an exposed portion of the dielectric layer.

The above features and advantages and other features and advantages of the invention are readily apparent from the following detailed description of the invention when taken in connection with the accompanying drawings.

BRIEF DESCRIPTION OF THE DRAWINGS

The following Figures are exemplary embodiments, which are provided to illustrate the present disclosure. The figures are not intended to limit devices made in accordance with the disclosure to the materials, conditions, or process parameters set forth herein.

FIG. 11 depicts a table of other specifications for the example design-1 antenna assembly illustrated in FIG. 6 in accordance with a non-limiting embodiment;

FIG. 18 depicts a table of other specifications for the example design-2 antenna assembly illustrated in FIG. 15 in accordance with a non-limiting embodiment;

FIG. 24 depicts a table listing performance characteristics of a magnetodielectric material used with the example design-1 antenna of FIG. 4 and the example design-2 antenna of FIG. 13 according to a non-limiting embodiment.

Figure 1:
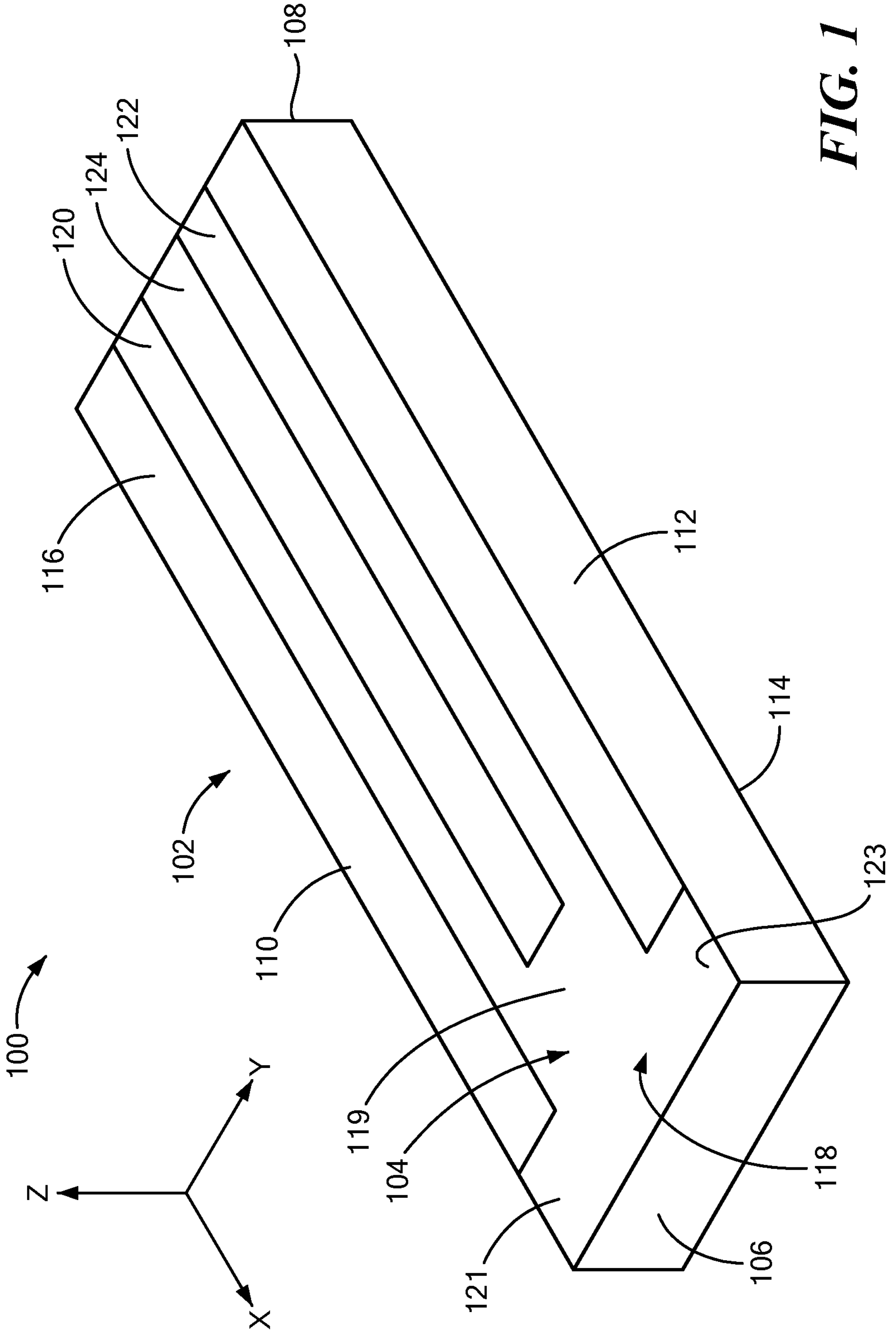
FIG. 1 depicts an isometric view of an example design-1 antenna in accordance with a non-limiting embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

The following examples are provided to illustrate the present disclosure. The examples are merely illustrative and are not intended to limit devices made in accordance with the disclosure to the materials, conditions, or process parameters set forth therein.

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

Turning now to an overview of technologies that are more specifically relevant to aspects of the present disclosure, hexagonal ferrites or hexaferrites are a type of iron-oxide ceramic compound that has a hexagonal crystal structure and exhibits magnetic properties. Several types of families of hexaferrites are known, including Z-type ferrites, Ba3Me2Fe24O41, and Y-type ferrites, Ba2Me2Fe12O22, where Me can be a small 2+ cation such as Co, Ni, or Zn, and Sr can be substituted for Ba. Other hexaferrite types include M-type ferrites ((Ba,Sr)Fe12O19), W-type ferrites ((Ba,Sr)Me2Fe16O27), X-type ferrites ((Ba,Sr) 2Me2Fe28O46), and U-type ferrites ((Ba,Sr) 4Me2Fe36O60).

Hexaferrites with a high magnetocrystalline anisotropy field are good candidates for gigahertz antenna substrates because they have a high magnetocrystalline anisotropy field and thereby a high ferromagnetic resonance frequency. While Co2Z hexaferrite (Ba3Co2Fe24O41) materials have been developed for some antenna applications, improved antenna designs utilizing magnetic materials are desired to achieve a miniaturized antenna that can be implemented in devices that require a miniaturized antenna capable of operating at very high frequencies (e.g., 2.4 GHz and/or 5 GHz) with minimal losses.

Turning now to an overview of the aspects of the present disclosure, one or more non-limiting embodiments address the above-described shortcomings of the prior art by providing a miniaturized antenna which includes a magnetodielectric substrate and an electromagnetic (EM) radiator. The EM radiator includes an electrically conductive material disposed on an upper surface of the substrate. The EM radiator further includes a root, and a pair of forks that are contiguous with and extend from the root along a first axis. The pair of forks are separated from one another by a slot in the electrically conductive material to define a fork-shaped EM radiator. The root includes a bridge portion extending between the pair of forks to electrically connect together the pair of forks to define a fork shaped miniaturized antenna capable of generating linearly polarized fields.

According to a non-limiting embodiment, the fork-shaped antenna is disposed on a magnetodielectric substrate with a permittivity of about 8.86, for example, and permeability of about 1.63, for example, and loss tangents of about 0.002 and about 0.0429, for example. In one or more non-limiting embodiments, the thickness of the substrate can be optimized based on the characteristics of the magnetodielectric material to improve the efficiency, gain, and performance of the fork-shaped antenna. Accordingly, varying the properties of the magnetodielectric substrate properties contributes to the miniaturization of an antenna and leads to more than 50% of size reduction compared to existing high-frequency antenna designs.

In one or more non-limiting embodiments of the present disclosure, the fork-shaped antenna is loaded with a partial ground plane rather than the full ground plane which contributes to radiate electric fields from the bottom part of the material and allows for generating a radiation pattern in an omni-directional radiation pattern. Accordingly, the fork-shaped antenna described herein can be utilized in applications that generally require an electric field to radiate in transverse direction when placed vertically or sticked vertically to any device, while at the same time generating a no electric field along the z-direction i.e., null on top of the antenna. The thickness of the antenna can be optimized based on the properties of example substrates B and C (discussed further herein below) to achieve improved efficiency and gain. In various simulations, for example, the miniaturized antenna subscribed here achieved an impedance bandwidth of 18%.

An embodiment of an antenna as miniaturized fork-shape antenna for 2.4 GHz and/or 5 GHz operation that may be fabricated by printing or otherwise depositing an electrically conductive patch onto a magnetodielectric substrate. According to a non-limiting embodiment, the miniaturized antenna is a fork-shaped patch antenna formed on a substrate comprising 18H-type hexaferrite (e.g., a 18H ferrite substrate) and capable of generating linearly polarized fields.

A prototype antenna design in accordance with an embodiment disclosed herein was fabricated on a magnetodielectric material defining two substrates referred to herein as "substrate B" and "substrate C", with achieved properties (i.e., permittivity, and permeability with loss) developed in the laboratory. At least one goal was to demonstrate a material capability and an antenna printed on the same for 2.4 GHz and/or 5 GHz based on the application area utilizing the band. The design was started with the intention of miniaturization of an antenna and at the same time improving performances of an antenna used for 2.4 GHz and/or 5 GHz application space. Substrate B had a permittivity of 8.86 and permeability of 1.63 with the loss tangents of 0.002 and 0.0429. Similarly, substrate C had a permittivity of 14.4 and permeability of 1.8 with the loss tangents of 0.006 and 0.0378. These properties were formulated at 2.4 GHz in the laboratory. The novel material properties and design achieved significant improvement in the miniaturization of the antenna design as well as other performance characteristics such as, for example, efficiency and impedance bandwidth which are crucial for any designs used for 2.4 GHz and 5 GHz applications.

According to one or more non-limiting embodiments, the fork-shaped antenna according to a first design referred to herein as "example design-1 antenna" includes a root that is designed on the substrate B having a permittivity of 8.86 ($\varepsilon'$) and permeability of 1.63 ($\mu'$), with the loss tangents of 0.002 ($\varepsilon''/\varepsilon'$) and 0.0429 ($\mu''/\mu'$). According to another non-limiting embodiment, the fork-shaped antenna according to a second design referred to herein as "example design-2 antenna" includes a root that is designed on the substrate C having a permittivity of 14.4 ($\varepsilon'$) and permeability of 1.80 ($\mu'$), with the loss tangents of 0.006 ($\varepsilon''/\varepsilon'$) and 0.0378 ($\mu''/\mu'$). The performances of example design-1 antenna and example design-2 antenna are in combination with substrate B and substrate C, respectively, which was for all inventive designs based on the corresponding magnetodielectric material of the substrates. The magnetodielectric substrates add the beneficial feature of miniaturization factor which is important in prototypes build and measured.

While embodiments illustrated and described herein depict an example miniaturized fork-shaped antenna and antenna assembly in various two-dimensional (2D) plan view geometries, it will be appreciated that this geometry is merely one example of many geometries that may be employed in the design of a miniaturized fork-shaped antenna and antenna assembly as disclosed herein depending on the desired performance characteristics (polarization, operating frequencies, bandwidths, gains, return losses, radiation patterns, etc.) of the miniaturized fork-shaped antenna and antenna assembly. It will also be appreciated that the disclosed geometry may be modified without departing from a scope of the invention. As such, the disclosure herein applies to any miniaturized fork-shaped antenna and antenna assembly design that falls within the ambit of the appended claims, and any 2D geometry of the fork-shaped antenna and antenna assembly that falls within the ambit of the disclosure herein, and is suitable for a purpose disclosed herein, is contemplated and considered to be complementary to the particular embodiments disclosed herein.

Reference is now made to FIGS. 1-24.

FIG. 1 depicts an isometric view of an example design-1 antenna 100 in accordance with a non-limiting embodiment. The example design-1 antenna 100 includes a substrate 102 and an electromagnetic (EM) radiator 104 formed on an upper surface of the substrate 102. The substrate 102 extends from a first substrate end 106 to an opposing second substrate end 108 along a first axis (e.g., an X-axis) to define a substrate length, $Sub_x$, extends from a third substrate end 110 to a fourth substrate end 112 along a second axis (e.g., a Y-axis) to define a substrate width, $Sub_y$, and further extends from a lower substrate surface 114 to an upper substrate surface 116 along a third axis (e.g., a Z-axis) to define a substrate thickness, $Sub_z$.

The EM radiator 104 includes an electrically conductive material disposed on an upper surface of the substrate 102 to define a root 118 and a pair of forks 120 and 122. The forks 120 and 122 are contiguous with and extend from the root 118 along the first axis (e.g., X-axis), and are separated from one another by a slot 124. The slot 124 is formed in the electrically conductive material and has a slot length, $Slot_L$, extending along the first axis (e.g., the X-axis) to define a fork-shaped EM radiator 104.

The root 118 extends along the first axis (e.g., the X-axis) from a first shoulder 121 to an opposing second shoulder 123 to define a root length, $ForkRoot_L$, and extends along the second axis (e.g., includes a bridge portion 119 extending between the pair of forks 120 and 122 in a direction of the second axis (e.g., the Y-axis) perpendicular to the first axis (e.g., the X-axis) to define a slot width, $Slot_W$, and electrically connect together the pair of forks 120 and 122. Here, the substrate length, $Sub_x$, minus the root length, $ForkRoot_L$, is greater than the slot length, $Slot_L$, and the slot end terminates before reaching the first and second shoulders 121 and 123.

Figure 2:
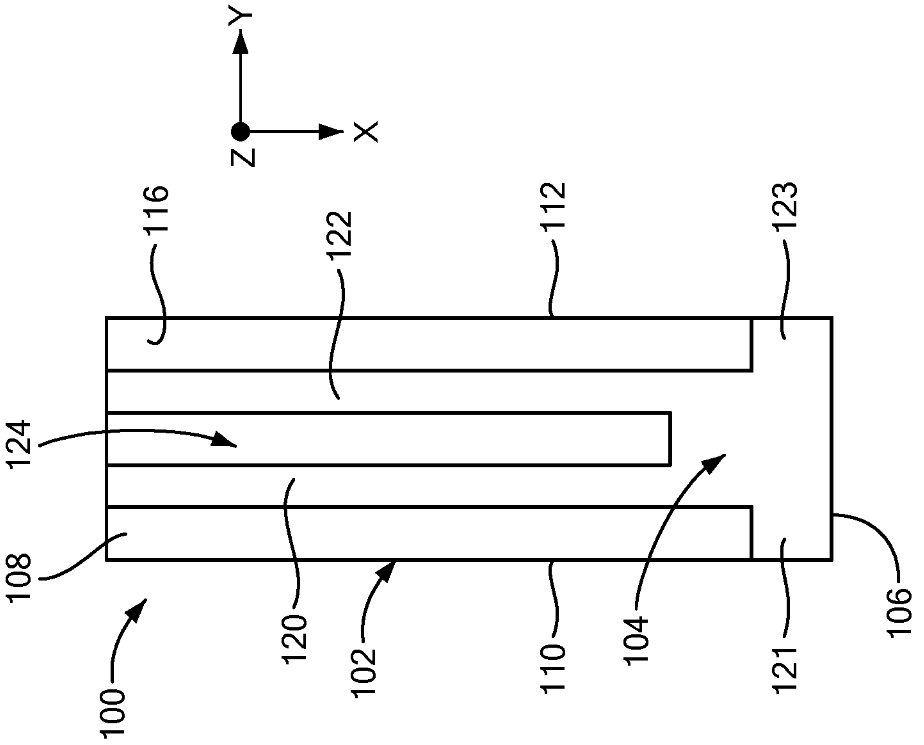
FIG. 2 depicts a top view of the example design-1 antenna illustrated in FIG. 1 in accordance with a non-limiting embodiment.

FIG. 2 depicts a top view of the example design-1 antenna 100 illustrated in FIG. 1 in accordance with a non-limiting embodiment. While particular specifications are defined, it will be appreciated that these are for example purposes only, and may be modified depending on the desired antenna performance characteristics for a particular application.

Figure 3:
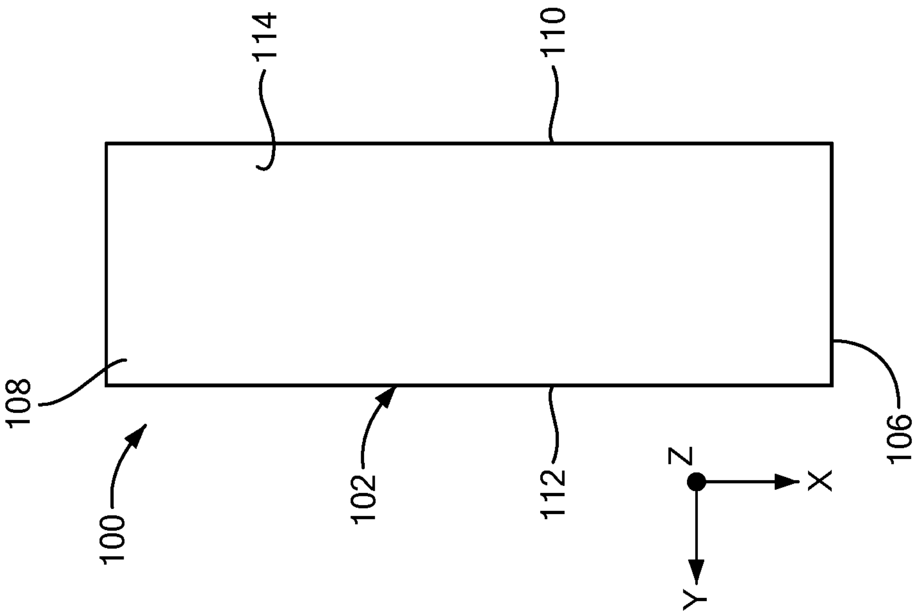
FIG. 3 depicts a bottom view of the example design-1 antenna illustrated in FIG. 1 in accordance with a non-limiting embodiment.

FIG. 3 depicts a bottom view of the example design-1 antenna 100 illustrated in FIG. 1 in accordance with a non-limiting embodiment.

Figure 4:
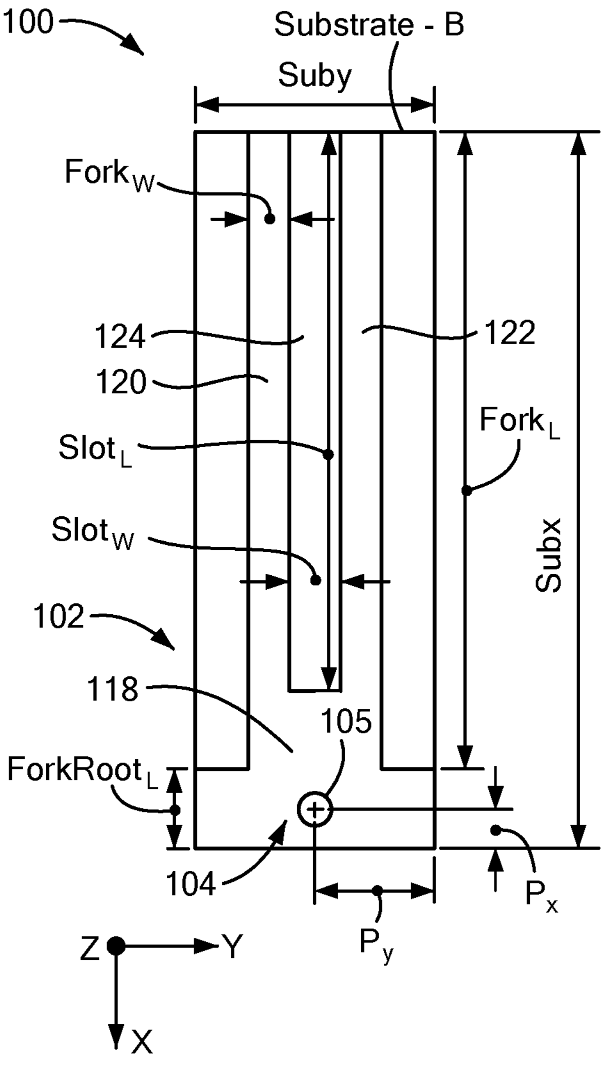
FIG. 4 depicts a top view of the example design-1 antenna illustrated in FIG. 1 with example design specifications, in accordance with an embodiment.

FIG. 4 depicts a top view of the example design-1 antenna 100 illustrated in FIG. 1 with example design specifications, in accordance with an embodiment. While particular specifications 250 are defined, it will be appreciated that these are for example purposes only, and may be modified depending on the desired antenna performance characteristics for a particular application. FIG. 4 also depicts particular dimensions 252 for the pair of forks 120 and 122 of the EM radiator 104, the root 118 of the EM radiator 104, the slot 124 of the EM radiator 104, and the substrate 102 on which the EM radiator 104 is formed are presented. And while particular dimensions are presented, it will be appreciated that these are for example purposes only, and may be modified depending on the desired antenna performance characteristics for a particular application. FIG. 4 also depicts the location of a via 105 relative to the root 118.

Figure 5:
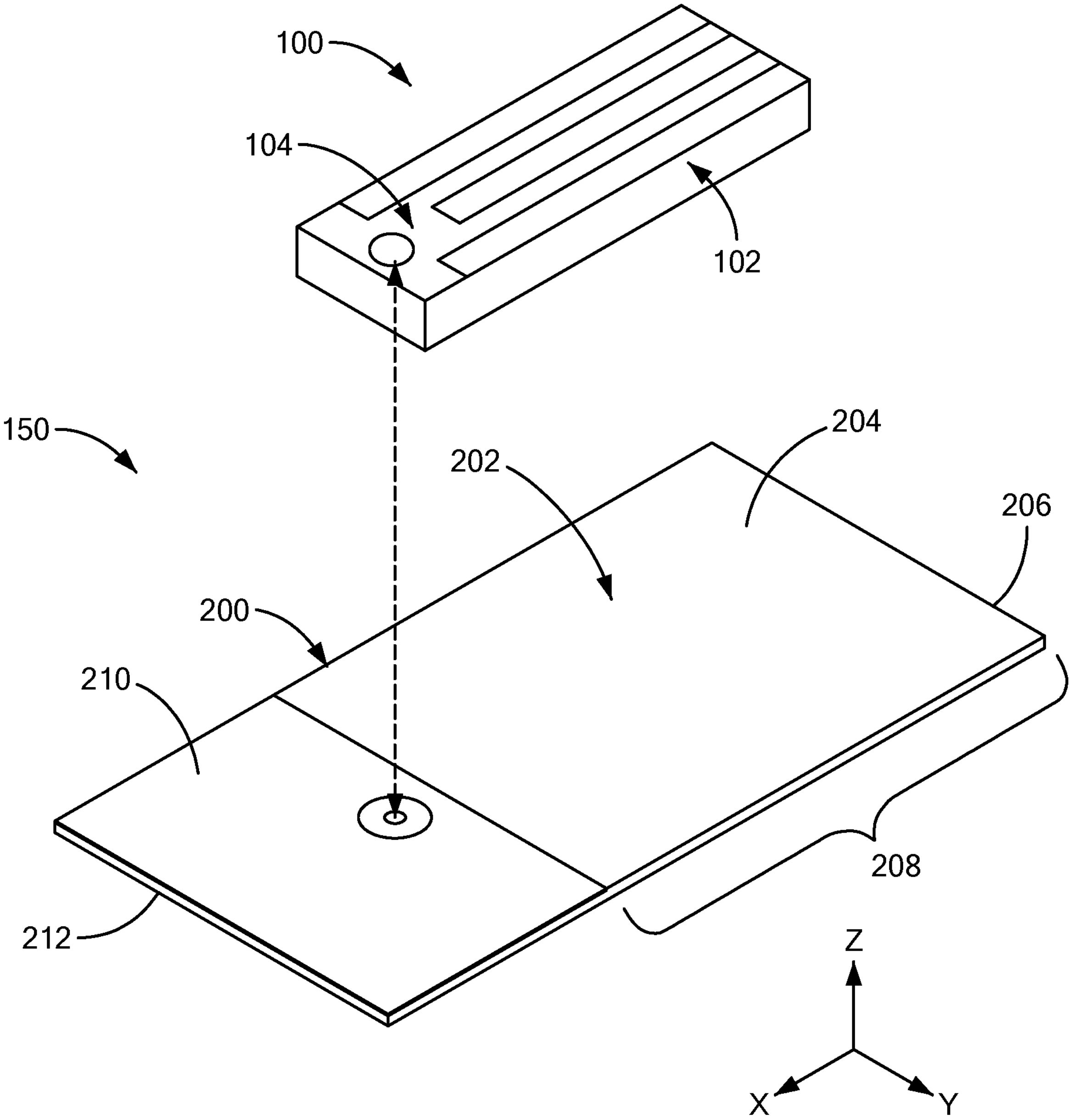
FIG. 5 depicts an isometric view of a disassembled example design-1 antenna assembly including a host board and the example design-1 antenna illustrated in FIG. 1 in accordance with a non-limiting embodiment.

FIG. 5 depicts an isometric view of a disassembled example design-1 antenna assembly 150 including a host board 200 and the example design-1 antenna 100 illustrated in FIG. 1 in accordance with a non-limiting embodiment. The host board 200 includes a dielectric layer 202, a top metal layer 210, and a bottom metal layer 212. The dielectric layer 202 includes an upper dielectric surface 204 and a lower dielectric surface 206 located opposite the upper dielectric surface 204. The top metal layer 210 is disposed on and bonded to a portion of the upper dielectric surface 204, while the bottom metal layer 212 is disposed on and bonded to the lower dielectric surface 206. Accordingly, a region of the host board 200 excluding the top metal layer 210 defines an exposed portion 208 of the dielectric layer 202.

Figure 6:
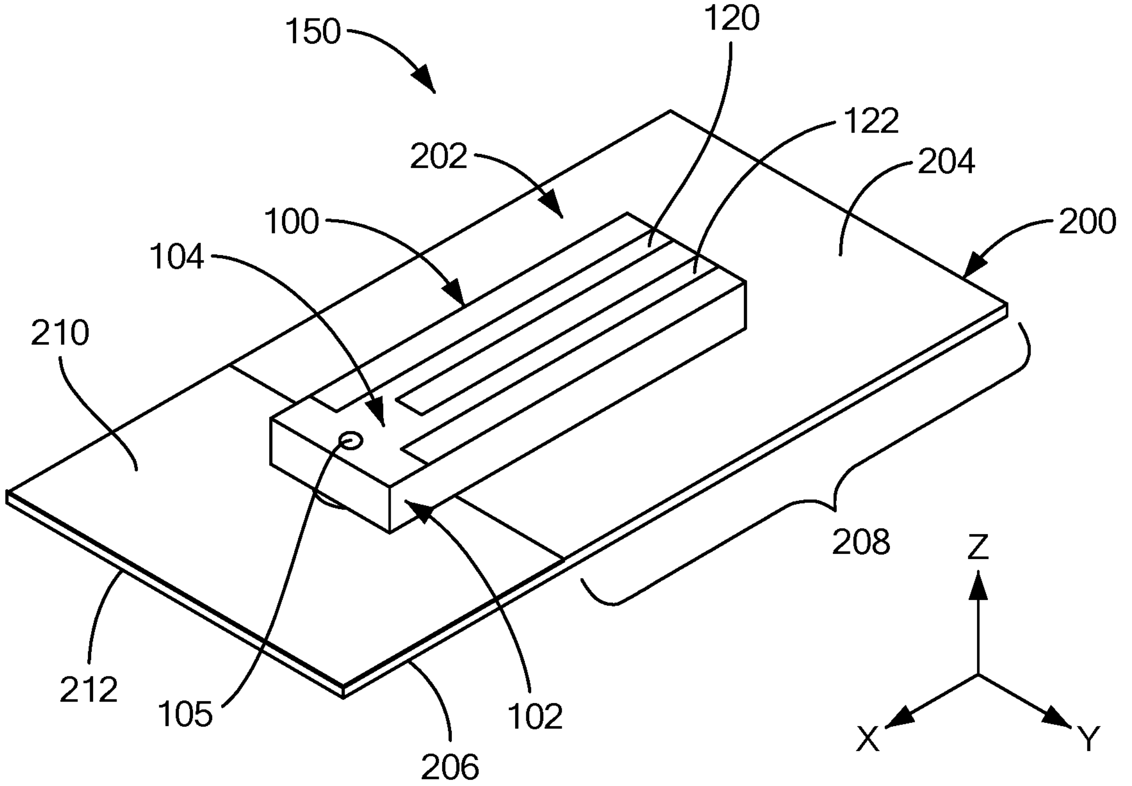
FIG. 6 depicts an isometric view of an assembled example design-1 antenna assembly illustrated in FIG. 5 in accordance with a non-limiting embodiment.

FIG. 6 depicts an isometric view of an assembled example design-1 antenna 150 assembly illustrated in FIG. 1 in accordance with a non-limiting embodiment.

Figure 7:
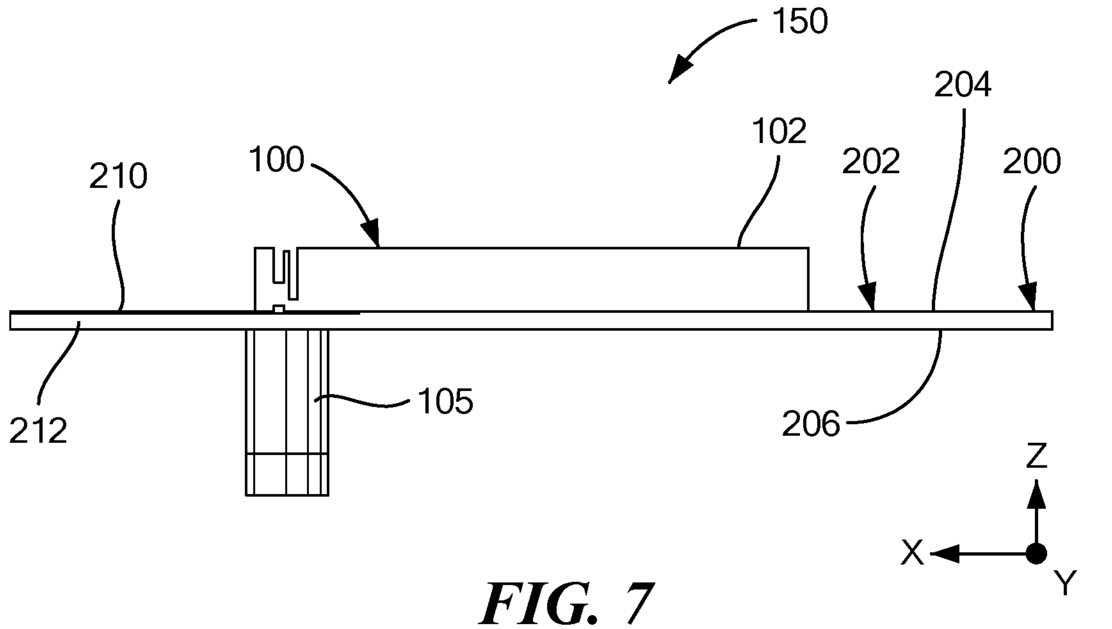
FIG. 7 depicts a side view of the assembled example design-1 antenna assembly illustrated in FIG. 6 in accordance with a non-limiting embodiment.

FIG. 7 depicts a side view of the assembled example design-1 antenna assembly 150 illustrated in FIG. 6 in accordance with a non-limiting embodiment.

Figure 8:
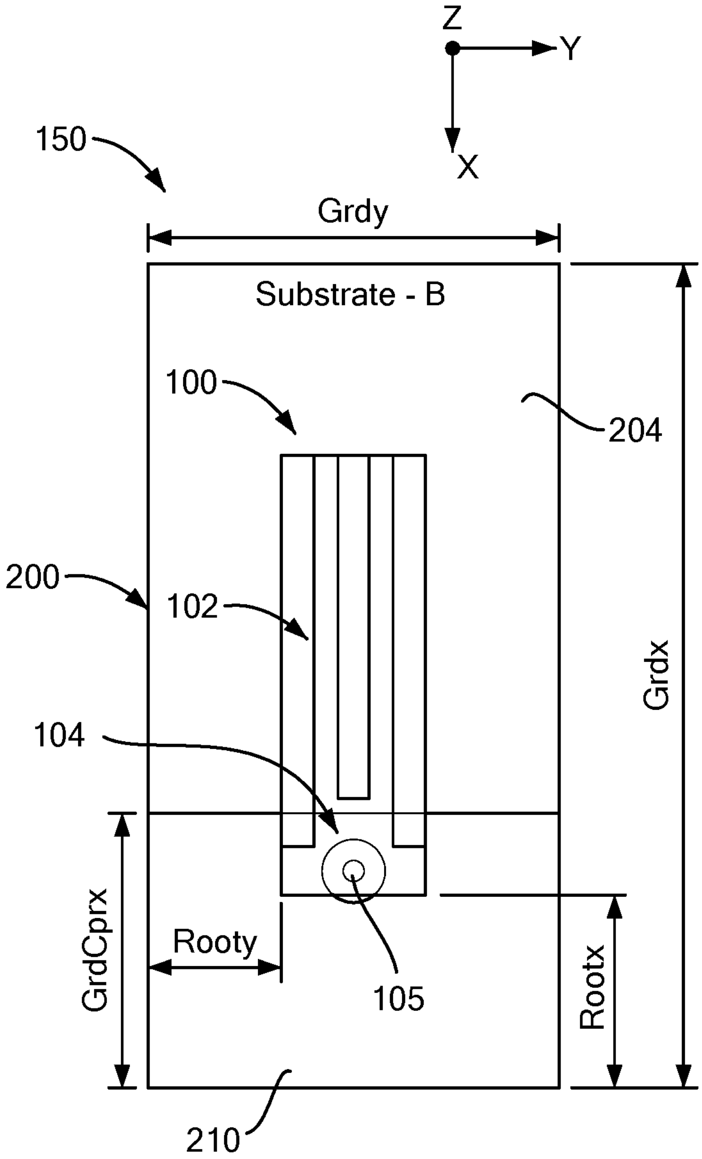
FIG. 8 depicts a top view of the example design-1 antenna assembly illustrated in FIG. 6 with example fabrication details, in accordance with a non-limiting embodiment.

FIG. 8 depicts a top view of the example design-1 antenna assembly 150 illustrated in FIG. 6 with example fabrication details, in accordance with a non-limiting embodiment. Here, particular dimensions 254 for the host board on which the example design-1 antenna 100 is disposed are presented. While particular dimensions 254 are presented, it will be appreciated that these are for example purposes only, and may be modified depending on the desired antenna performance characteristics for a particular application. FIG. 8 also depicts dimensions associated with the location of the root 104 relative to the host board 200.

Figure 9:
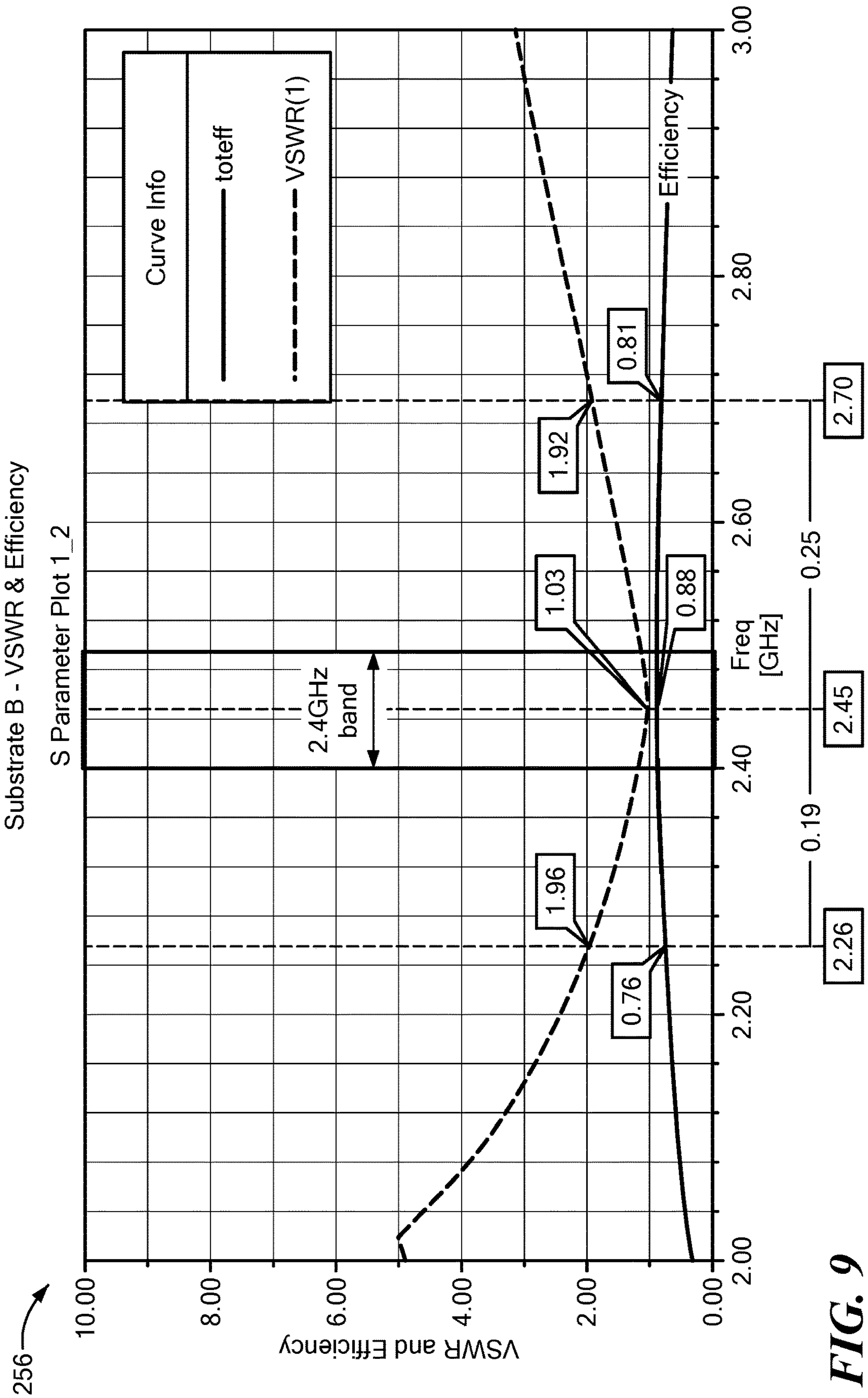
FIG. 9 depicts performance characteristics of the example design-1 antenna assembly illustrated in FIG. 6 in accordance with a non-limiting embodiment.

FIG. 9 depicts performance characteristics 256 of the example design-1 antenna assembly illustrated in FIG. 6 in accordance with a non-limiting embodiment.

Figure 10:
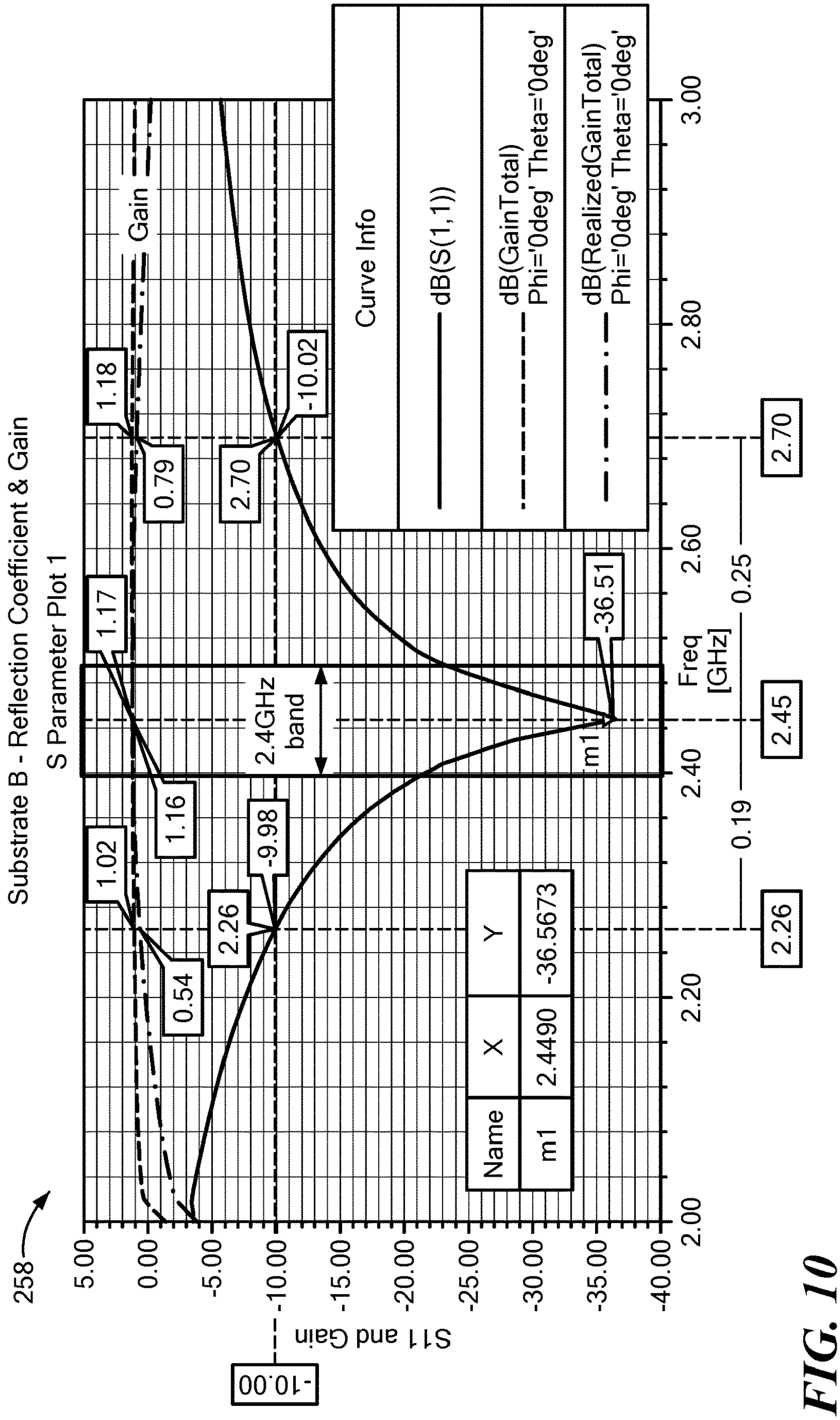
FIG. 10 depicts other performance characteristics of the example design-1 antenna assembly illustrated in FIG. 6 in accordance with a non-limiting embodiment.

FIG. 10 depicts other performance characteristics 258 of the example design-1 antenna 150 assembly illustrated in FIG. 6 in accordance with a non-limiting embodiment.

FIG. 11 depicts a table of other specifications 260 for the example design-1 antenna assembly 150 illustrated in FIG. 6 in accordance with a non-limiting embodiment.

Figure 12:
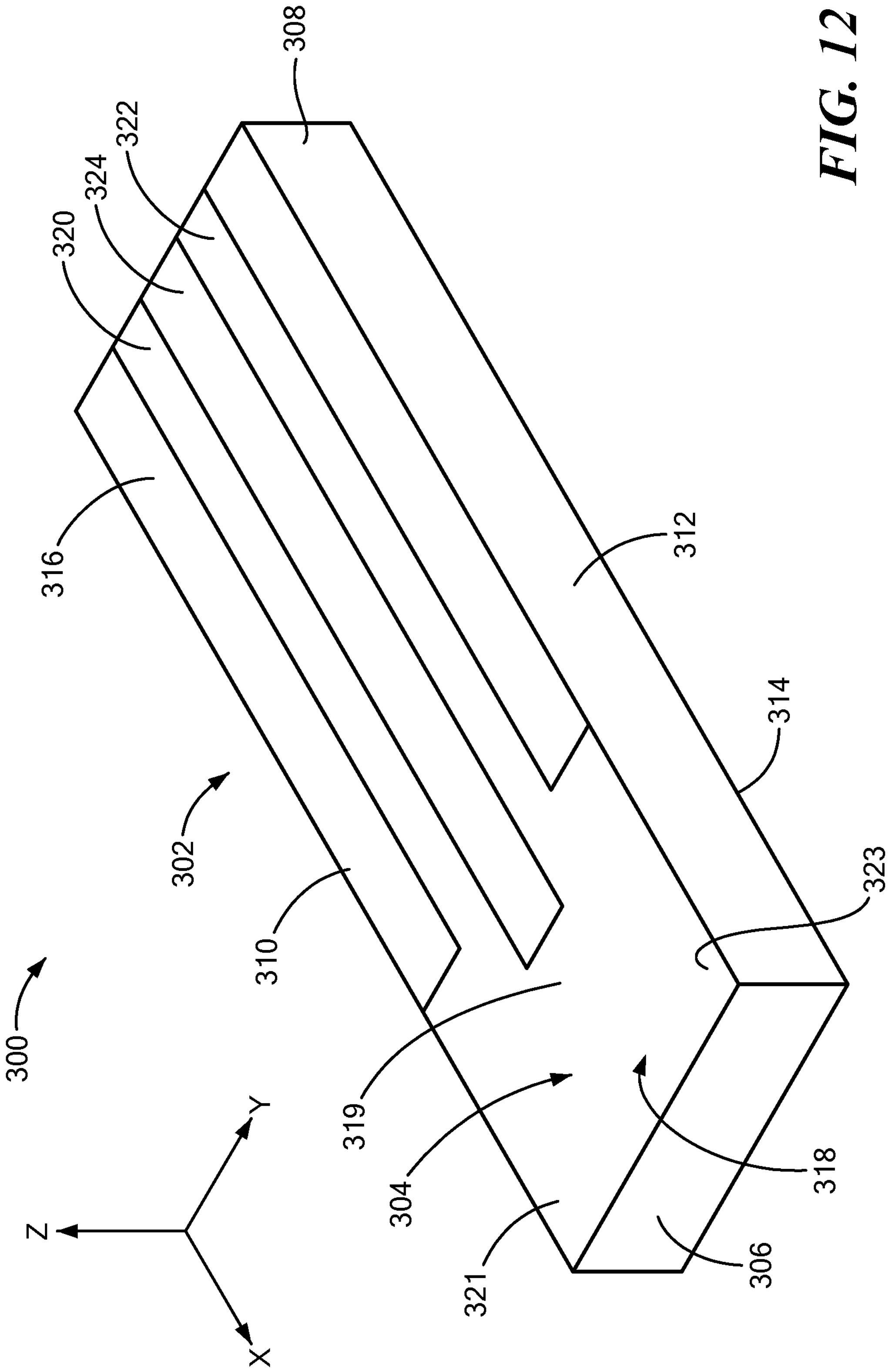
FIG. 12 depicts an isometric view of an example design-2 antenna in accordance with a non-limiting embodiment.

FIG. 12 depicts an isometric view of an example design-2 antenna 300 in accordance with a non-limiting embodiment. The example design-2 antenna 300 includes a substrate 302 and an electromagnetic (EM) radiator 304 formed on an upper surface of the substrate 302. The substrate 302 extends from a first substrate end 306 to an opposing second substrate end 308 along a first axis (e.g., an X-axis) to define a substrate length, $Sub_x$, extends from a third substrate end 310 to a fourth substrate end 312 along the second axis (e.g., a Y-axis) to define a substrate width, $Sub_y$, and further extends from a lower substrate surface 314 to an upper substrate surface 316 along a third axis (e.g., a Z-axis) to define a substrate thickness, $Sub_z$.

The EM radiator 304 includes an electrically conductive material disposed on an upper surface of the substrate 302 to define a root 318 and a pair of forks 320 and 322. The forks 320 and 322 are contiguous with and extend from the root 318 along the first axis (e.g., X-axis), and are separated from one another by a slot 324. The slot 324 is formed in the electrically conductive material and has a slot length, $Slot_L$, extending along the first axis (e.g., the X-axis) to define a fork-shaped EM radiator 304.

The root 318 extends along the first axis (e.g., the X-axis) from a first shoulder 321 to an opposing second shoulder 323 to define a root length, $ForkRoot_L$, and extends along the second axis (e.g., includes a bridge portion 319 extending between the pair of forks 320 and 322 in a direction of the second axis (e.g., the Y-axis) perpendicular to the first axis (e.g., the X-axis) to define a slot width, $Slot_W$, and electrically connect together the pair of forks 320 and 322. Here, the substrate length, $Sub_x$, minus the root length, $ForkRoot_L$, is less than the slot length, $Slot_L$, and the slot end extends beyond the first and second shoulders 321 and 323 such that the slot end extends into the root 318.

Figure 13:
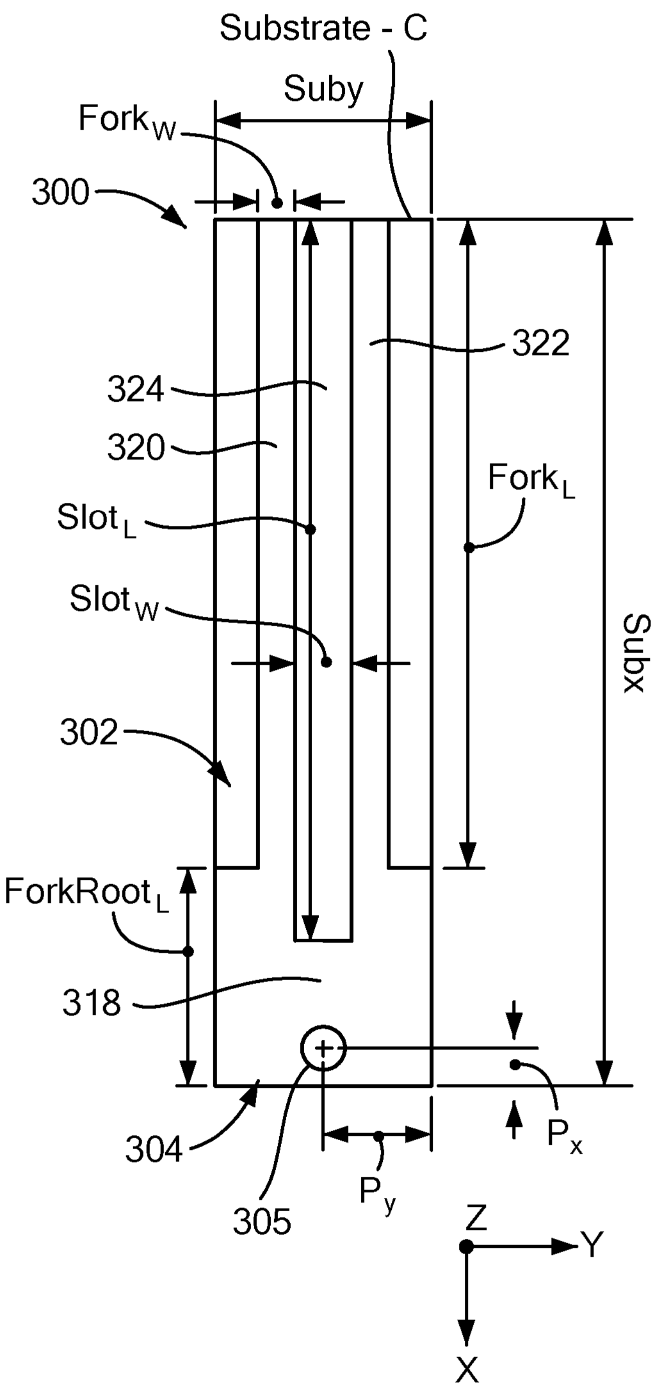
FIG. 13 depicts a top view of an example design-2 antenna illustrated with example design specifications, in accordance with a non-limiting embodiment.

FIG. 13 depicts a top view of an example design-2 antenna 300, with example design specifications 450 in accordance with an embodiment. While particular specifications 450 are defined, it will be appreciated that these are for example purposes only, and may be modified depending on the desired antenna performance characteristics for a particular application. FIG. 13 also depicts particular dimensions 452 for the pair of forks 320, 322 of the EM radiator 304, the root 318 of the EM radiator 304, the slot 324 of the EM radiator 304, and the substrate 302 on which the EM radiator 304 is formed are presented. And while particular dimensions 452 are presented, it will be appreciated that these are for example purposes only, and may be modified depending on the desired antenna performance characteristics for a particular application. FIG. 13 also depicts the location of a via relative to the root.

Figure 14:
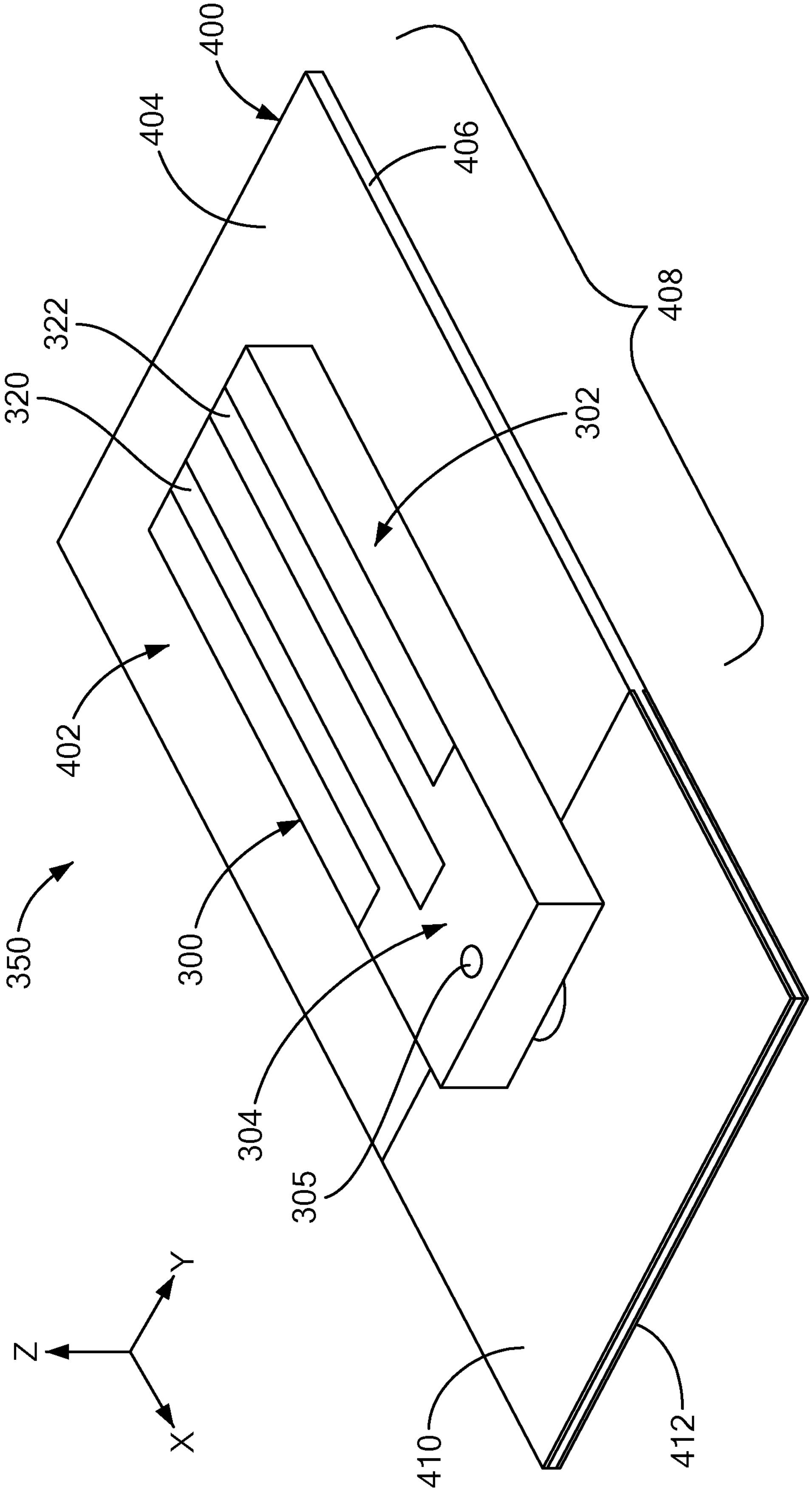
FIG. 14 depicts an isometric view of an assembled example design-2 antenna assembly including the example design-2 antenna shown in FIG. 12 in accordance with a non-limiting embodiment.

FIG. 14 depicts an isometric view of an assembled example design-2 antenna assembly 350 including the example design-2 antenna 300 in accordance with a non-limiting embodiment.

Figure 15:
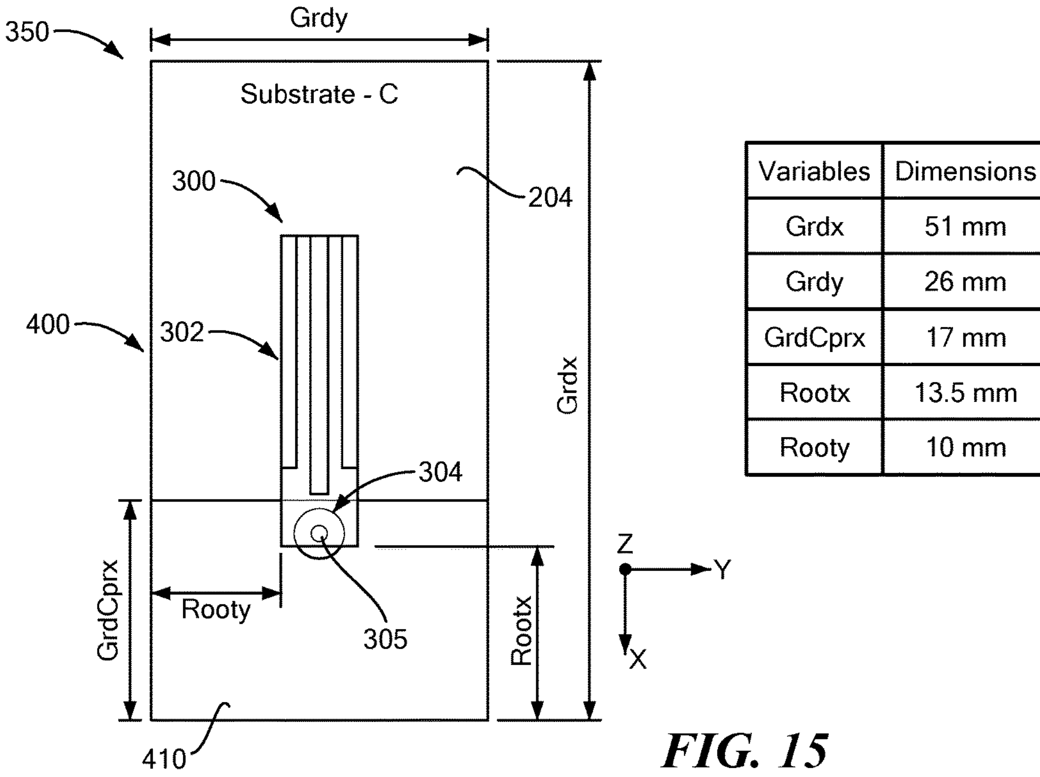
FIG. 15 depicts a top view of an example design-2 antenna assembly including the example design-2 antenna of FIG. 14 illustrated with example design specifications, in accordance with a non-limiting embodiment.

FIG. 15 depicts a top view of the example design-2 antenna assembly 350 including the example design-2 antenna 300, with example fabrication details in accordance with a non-limiting embodiment. Here, particular dimensions 454 for the host board 400 on which the example design-2 antenna 300 is disposed are presented. While particular dimensions 454 are presented, it will be appreciated that these are for example purposes only, and may be modified depending on the desired antenna performance characteristics for a particular application. FIG. 15 also depicts dimensions associated with the location of the root 304 relative to the host board 400.

Figure 16:
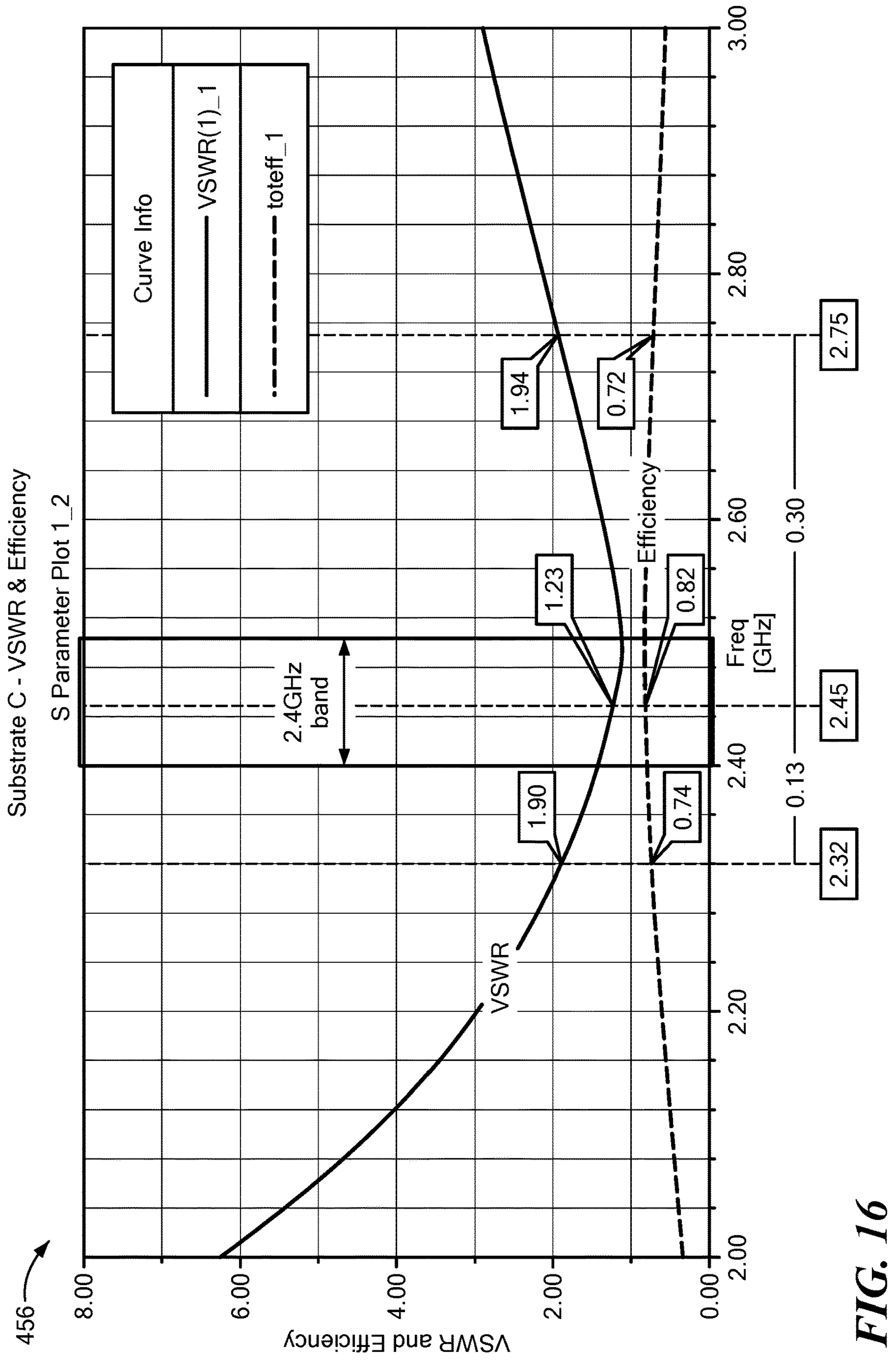
FIG. 16 depicts performance characteristics of the example design-2 antenna assembly illustrated in FIG. 15 in accordance with a non-limiting embodiment.

FIG. 16 depicts performance characteristics 456 of the example design-2 antenna assembly 350 illustrated in FIG. 15 in accordance with a non-limiting embodiment.

Figure 17:
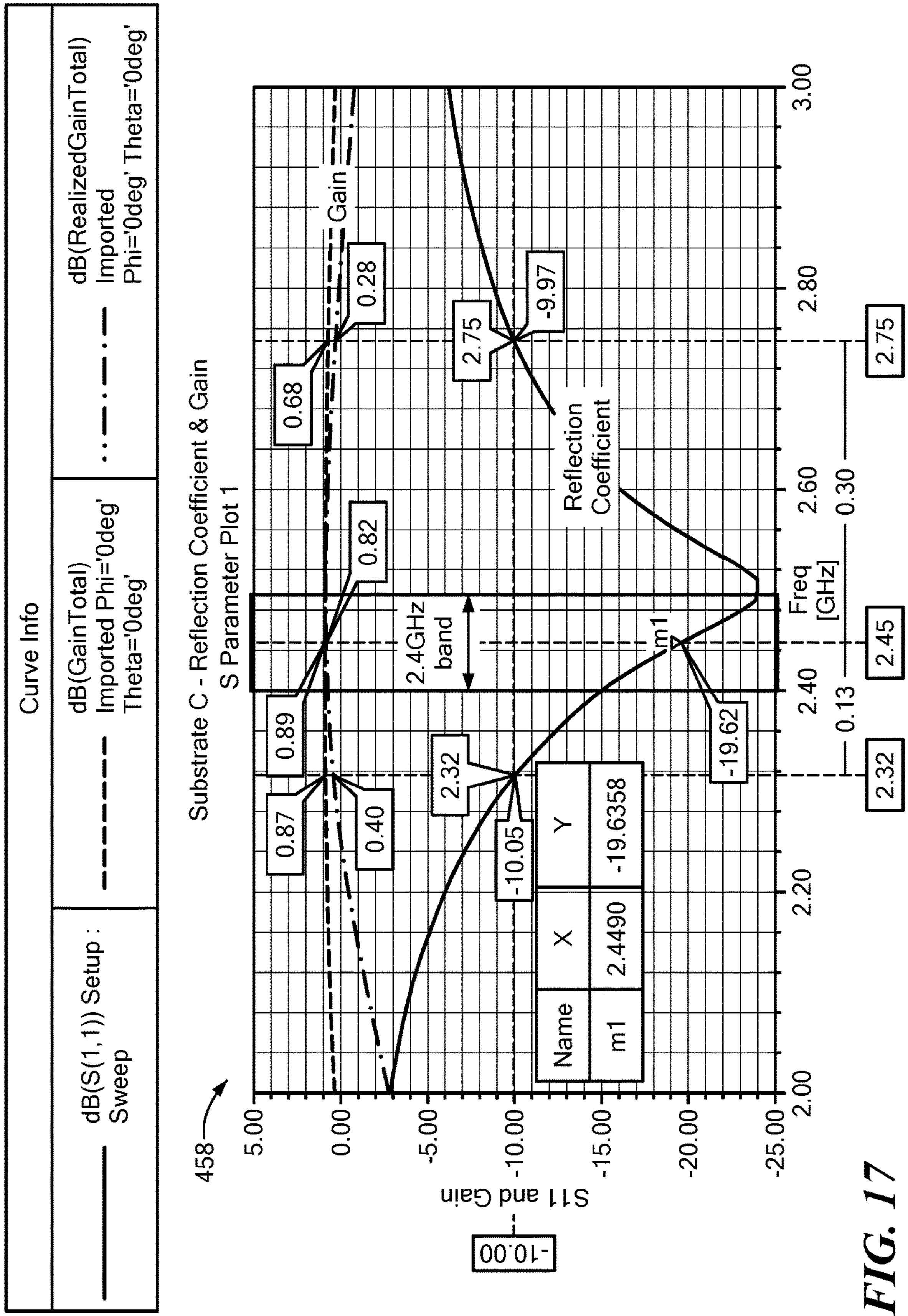
FIG. 17 depicts other performance characteristics of the example design-2 antenna assembly illustrated in FIG. 15 in accordance with a non-limiting embodiment.

FIG. 17 depicts other performance characteristics 458 of the example design-2 antenna assembly 350 illustrated in FIG. 15 in accordance with a non-limiting embodiment.

FIG. 18 depicts a table of other specifications 460 for the example design-2 antenna assembly 350 illustrated in FIG. 15 in accordance with a non-limiting embodiment.

Figure 19:
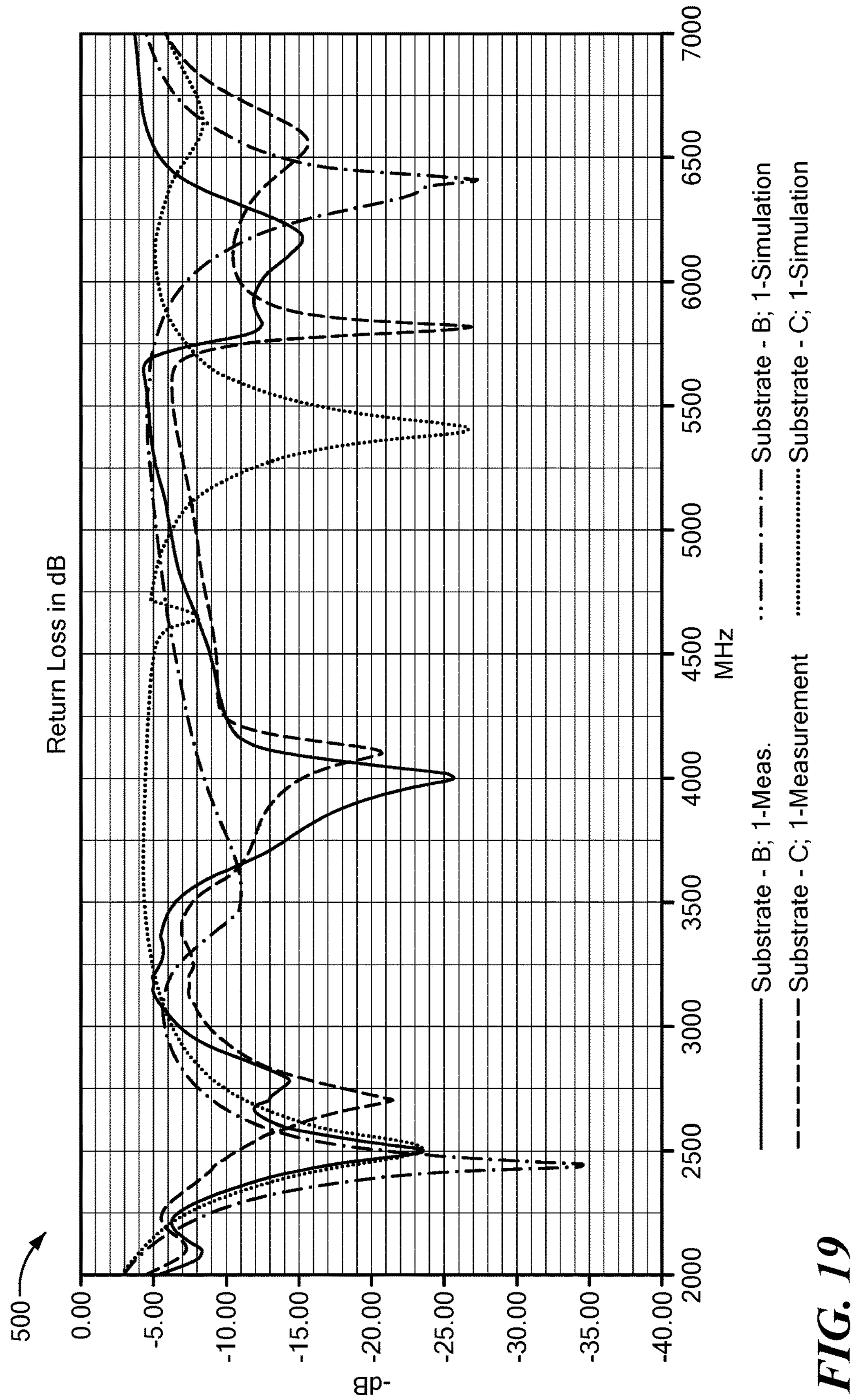
FIG. 19 depicts performance data of the of the example design-1 antenna assembly illustrated in FIG. 8 and the example design-2 antenna assembly illustrated in FIG. 15 in accordance with a non-limiting embodiment.

FIG. 19 depicts performance data 500 of the of the example design-1 antenna assembly 150 and the example design-2 antenna assembly 350 in accordance with a non-limiting embodiment.

Figure 20:
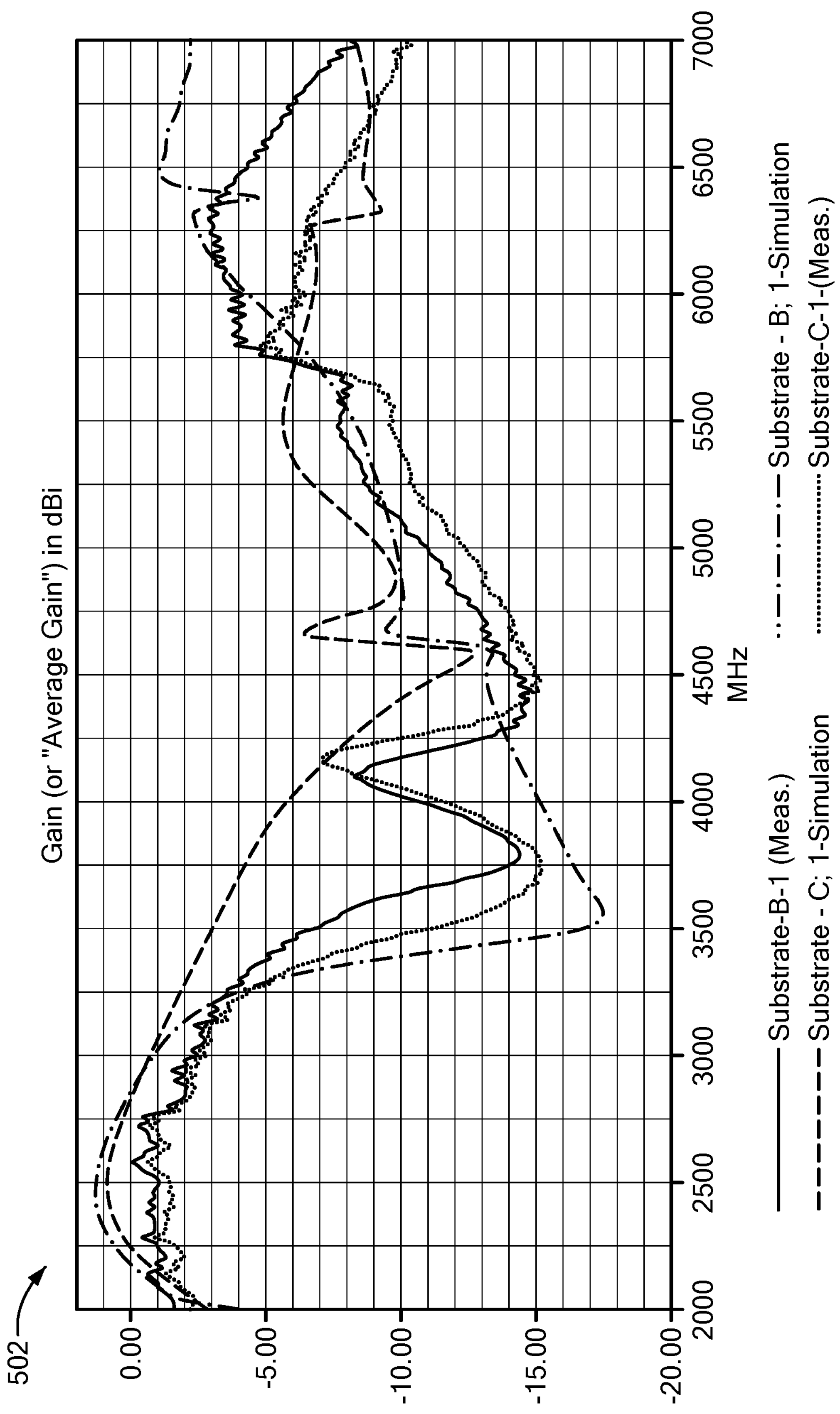
FIG. 20 depicts other performance data of the of the example design-1 antenna assembly illustrated in FIG. 8 and the example design-2 antenna assembly illustrated in FIG. 15 in accordance with a non-limiting embodiment.

FIG. 20 depicts other performance data 502 of the of the example design-1 antenna assembly 150 and the example design-2 antenna assembly 350 in accordance with a non-limiting embodiment.

Figure 21:
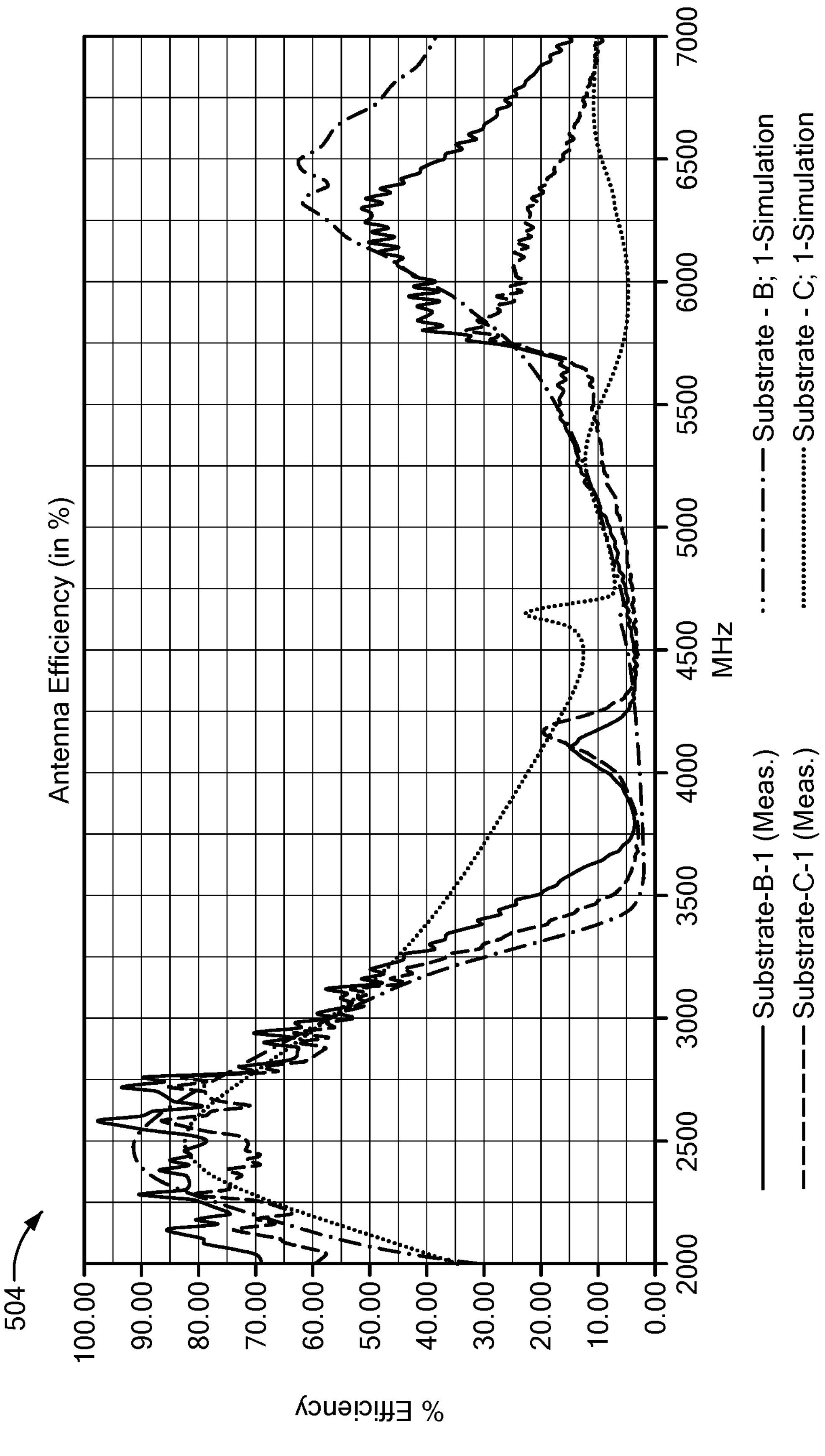
FIG. 21 depicts further performance data of the of the example design-1 antenna assembly illustrated in FIG. 8 and the example design-2 antenna assembly illustrated in FIG. 15 in accordance with a non-limiting embodiment.

FIG. 21 depicts further performance data 504 of the of the example design-1 antenna assembly 150 and the example design-2 antenna assembly 350 in accordance with a non-limiting embodiment.

Figure 22:
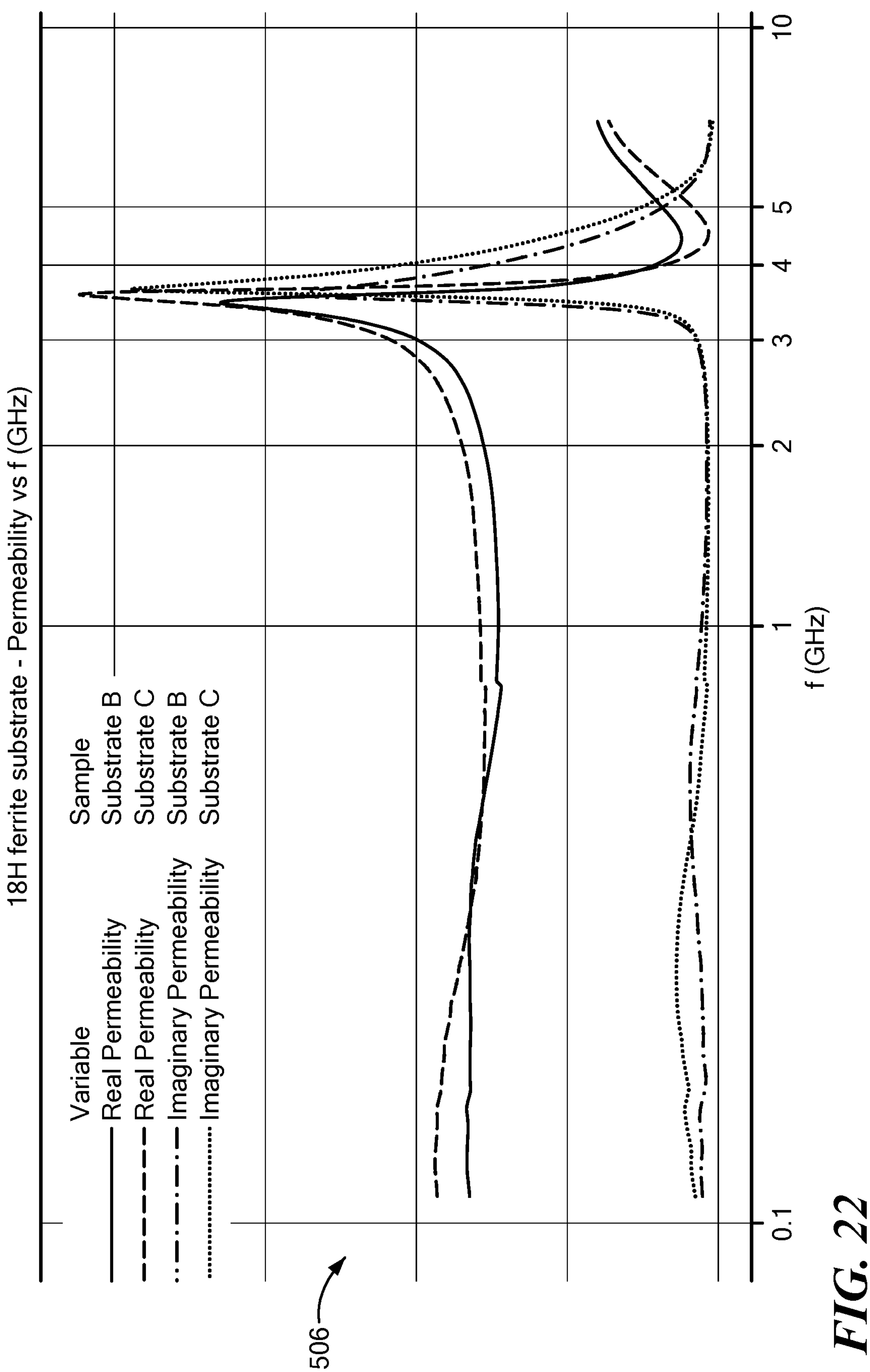
FIG. 22 depicts performance characteristics of a magnetodielectric material used with the example design-1 antenna of FIG. 4 and the example design-2 antenna of FIG. 13 according to a non-limiting embodiment.

FIG. 22 depicts performance characteristics 506 of a magnetodielectric material used with the example design-1 antenna 150 and the example design-2 antenna 350 according to a non-limiting embodiment.

Figure 23:
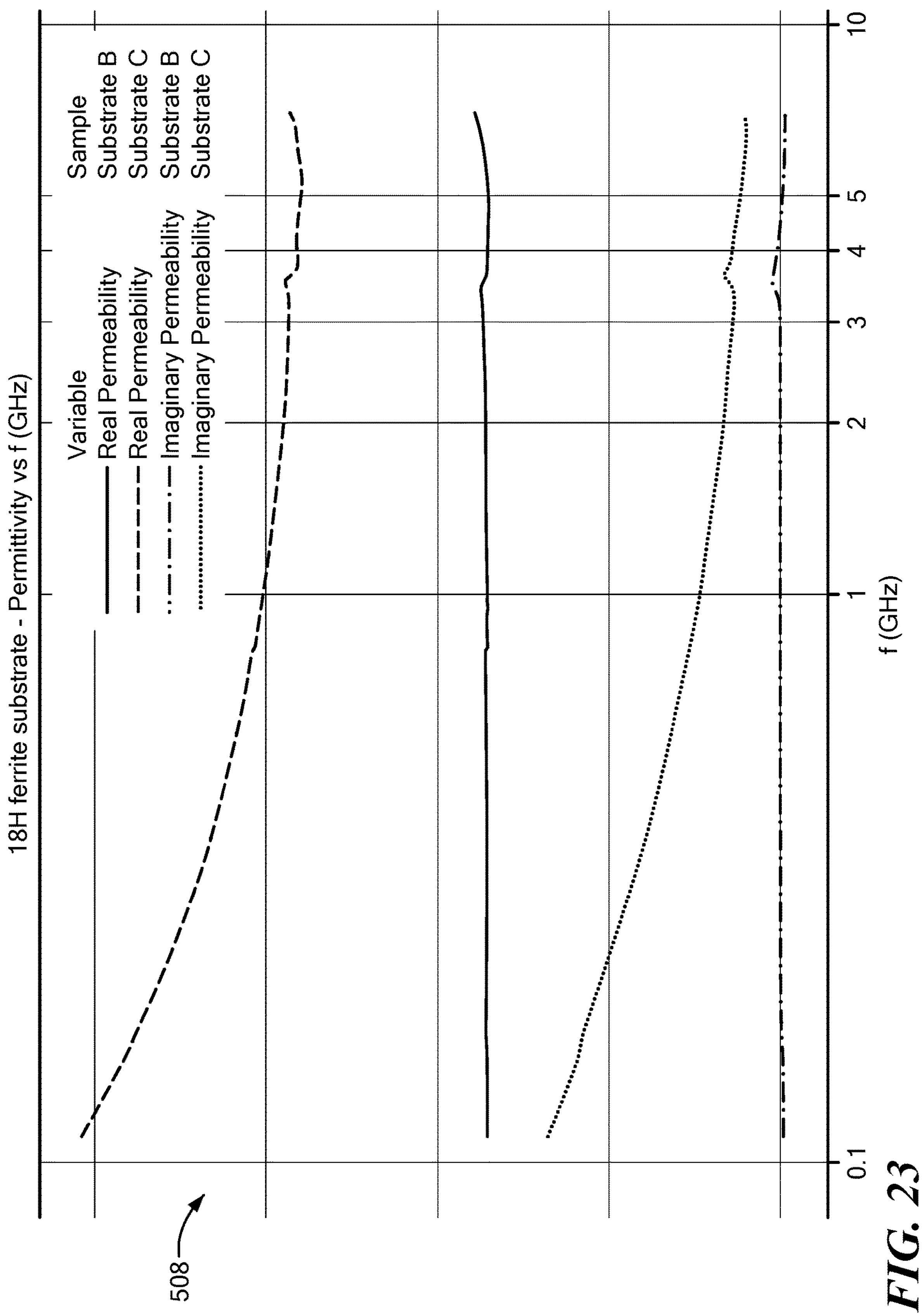
FIG. 23 depicts other performance characteristics of a magnetodielectric material used with the example design-1 antenna of FIG. 4 and the example design-2 antenna of FIG. 13 according to a non-limiting embodiment.

FIG. 23 depicts other performance characteristics 508 of a magnetodielectric material used with the example design-1 antenna 150 and the example design-2 antenna 350 according to a non-limiting embodiment.

FIG. 24 depicts a table 510 listing performance characteristics of a magnetodielectric material used with the example design-1 antenna 150 and the example design-2 antenna 350 according to a non-limiting embodiment.

As described in FIGS. 1-8 and 12-15, for example, one or more non-limiting embodiments provide an antenna, comprising a substrate comprising a magnetodielectric material; and an electromagnetic, EM, radiator comprising an electrically conductive material disposed on an upper surface of the substrate, the EM radiator including a root, and a pair of forks that are contiguous with and extend from the root along a first axis, the pair of forks being separated from one another by a slot in the electrically conductive material of the EM radiator to define a fork-shaped EM radiator, wherein the root includes a bridge portion extending between the pair of forks in a direction of a second axis perpendicular to the first axis to electrically connect together the pair of forks; wherein the magnetodielectric material comprises a hexagonal ferrite material; wherein the hexagonal ferrite material includes 18H-type hexaferrite; wherein the substrate can be formed as a single layer comprising the magnetodielectric material, or can be formed as a plurality of layers each comprising the magnetodielectric material; wherein the substrate extends from a first substrate end to an opposing second substrate end along the first axis to define a substrate length, $Sub_x$, and extends from a third substrate end to a fourth substrate end along the second axis to define a substrate width, $Sub_y$, and further extends from a lower substrate surface to an upper substrate surface along a third axis to define a substrate thickness, $Sub_z$; wherein the root has a bottom root end that defines a bottom of the EM radiator, and a shoulder root end that includes first and second opposing shoulders of the root, a distance between the bottom root end and the shoulder root end defining a root length, $ForkRoot_L$, and wherein the root extends along the second axis from a first root edge to an opposing second root edge to define a root width, $ForkRoot_W$; wherein the pair of forks comprises a first fork extending along the first axis from a first proximate end contacting the first shoulder to an opposing first distal end to define a first fork length, $Fork_{L1}$, and extending along the second axis from a first outer fork edge to a first inner fork edge to define a first fork width, $Fork_{W1}$; and a second fork spaced apart from the first fork along the second axis, the second fork extending along the first axis from a second proximate end contacting the second shoulder to an opposing second distal end to define a second fork length, $Fork_{L2}$, and extending along the second axis from a second outer fork edge to a second inner fork edge to define a second fork width, $Fork_{W2}$; wherein the slot is formed between the first and second inner fork edges and extends along the first axis from a slot end proximate the bridge portion to an opposing slot opening between the first and second distal ends to define a slot length, $Slot_L$; wherein the root extends away from the first and second outer fork edges along the second axis to define the first and second shoulders; and wherein a distance extending along the second axis between the first and second inner fork edges defines a slot width, $Slot_W$, of the slot.

As described in FIGS. 5-8 and 14-15, for example, one or more non-limiting embodiments also provides an antenna assembly comprising the example design-1 antenna or the example design-2 antenna, and further comprising: a host board comprising a dielectric layer including an upper dielectric surface and a lower dielectric surface located opposite the upper dielectric surface, a top metal layer disposed on and bonded to a portion of the upper dielectric layer, and a bottom metal layer disposed on and bonded to the lower dielectric surface; wherein a region of the host board excluding the top metal layer defines an exposed portion of the dielectric layer; wherein a first portion of the antenna is disposed on the top metal layer and a second portion of the antenna is disposed on the exposed portion of the dielectric layer; wherein the EM radiator is spaced apart from the host board by the substrate; wherein the host board extends along the first axis from a first board end to an opposing second board end to define a board length, $Grd_x$, extends along the second axis from a third board end to an opposing fourth board end to define a board width, $Grd_y$, and extends along the third axis from lower dielectric surface to lower dielectric surface to the first and second axes to define a board thickness, $Grd_z$; wherein the top metal layer extends along the first axis from a metal end to an opposing second metal end to define a metal surface length, GrdCprx; wherein the exposed portion of the dielectric layer extends along the first axis from the second metal end to the second board end to define an dielectric surface length, GrdInslx; wherein the dielectric surface length, GrdInslx, is greater than the metal surface length, GrdCprx; and further comprising an electrically conductive via extending through the root, the substrate, the top metal layer, and the bottom metal layer, the via configured to establish electrical conductivity between the antenna, the top metal layer and the bottom metal layer; wherein the via has a circular profile defining a via diameter, Vias; and wherein the via is arranged radially along the first axis and away from the first board end at a first via distance, $P_X$ and radially along the second axis and away from the third and fourth board ends at a second via distance, $P_Y$.

With collective reference to FIGS. 1-24, it will be appreciated that various aspects of an embodiment are disclosed herein, which are in accordance with, but not limited to, at least the following aspects and/or combinations of aspects.

Aspect 1: An antenna, comprising: a substrate comprising a magnetodielectric material; and an electromagnetic, EM, radiator comprising an electrically conductive material disposed on an upper surface of the substrate, the EM radiator including a root, and a pair of forks that are contiguous with and extend from the root along a first axis (e.g., X-axis), the pair of forks being separated from one another by a slot in the electrically conductive material of the EM radiator to define a fork-shaped EM radiator, wherein the root includes a bridge portion extending between the pair of forks in a direction of a second axis (e.g., Y-axis) perpendicular to the first axis to electrically connect together the pair of forks. See, for example, FIGS. 1 and 12.

Aspect 2: The antenna of Aspect 1, wherein the magnetodielectric material comprises a hexagonal ferrite material.

Aspect 3: The antenna of any one of Aspects 1 to 2, wherein the hexagonal ferrite material includes 18H-type hexaferrite.

Aspect 4: The antenna of any one of Aspects 1 to 3, wherein the substrate is a single layer comprising the magnetodielectric material.

Aspect 5: The antenna of any one of Aspects 1 to 3, wherein the substrate includes a plurality of layers, each of the layers comprising the magnetodielectric material.

Aspect 6: The antenna of any one of Aspects 1 to 5, wherein the substrate extends from a first substrate end to an opposing second substrate end along the first axis to define a substrate length, $Sub_x$, and extends from a third substrate end to a fourth substrate end along the second axis to define a substrate width, $Sub_y$, and further extends from a lower substrate surface to an upper substrate surface along a third axis (e.g., Z-axis) to define a substrate thickness, $Sub_z$.

Aspect 7: The antenna of Aspect 6, wherein the root has a bottom root end that defines a bottom of the EM radiator, and a shoulder root end that includes first and second opposing shoulders of the root, a distance between the bottom root end and the shoulder root end defining a root length, $ForkRoot_L$, and wherein the root extends along the second axis from a first root edge to an opposing second root edge to define a root width, $ForkRoot_W$.

Aspect 8: The antenna of Aspect 9, wherein the pair of forks comprises: a first fork extending along the first axis from a first proximate end contacting the first shoulder to an opposing first distal end to define a first fork length, $Fork_{L1}$, and extending along the second axis from a first outer fork edge to a first inner fork edge to define a first fork width, $Fork_{W1}$; and a second fork spaced apart from the first fork along the second axis, the second fork extending along the first axis from a second proximate end contacting the second shoulder to an opposing second distal end to define a second fork length, $Fork_{L2}$, and extending along the second axis from a second outer fork edge to a second inner fork edge to define a second fork width, $Fork_{W2}$.

Aspect 9: The antenna of Aspect 8, wherein the slot is formed between the first and second inner fork edges and extends along the first axis from a slot end proximate the bridge portion to an opposing slot opening between the first and second distal ends to define a slot length, $Slot_L$.

Aspect 10: The antenna of Aspects 8 or 9, wherein the root extends away from the first and second outer fork edges along the second axis (Y-axis) to define the first and second shoulders.

Aspect 11: The antenna of any one of Aspects 9 to 10, wherein a distance extending along the second axis between the first and second inner fork edges defines a slot width, $Slot_W$, of the slot.

Aspect 12: The antenna of Aspect 11, wherein the substrate length, $Sub_x$, minus the root length, $ForkRoot_L$, is greater than the slot length $Slot_L$. See, for example, FIGS. 1 to 4.

Aspect 13: The antenna of Aspect 12, wherein the slot end terminates before reaching the first and second shoulders. See, for example, FIGS. 1 to 4.

Aspect 14: The antenna of any one of Aspects 12 to 13, wherein: the substrate length, $Sub_x$, is equal to or greater than 23.00 mm and equal to or less than 29.00 mm, alternatively is equal to or greater than 24.00 mm and equal to or less than 28.00 mm, and further alternatively equal to or greater than 25.00 mm and equal to or less than 27.00 mm; the substrate width, $Sub_y$, is equal to or greater than 8.00 mm and equal to or less than 10.00 mm, alternatively is equal to or greater than 8.5 mm and equal to or less than 9.5 mm, and further alternatively is 9.00 mm; and the substrate thickness, $Sub_z$, is equal to or greater than 2.0 mm and equal to or less than 4.0, alternatively is equal to or greater than 2.5 mm and equal to or less than 3.5, and further alternatively is 3.00 mm.

Aspect 15: The antenna of any one of Aspects 12 to 14, wherein: the root length, $ForkRoot_L$, is equal to or greater than 2.0 mm and equal to or less than 4.0 mm, alternatively is equal to or greater than 2.5 mm and equal to or less than 3.5 mm, and further alternatively is 3.0 mm; and the root width, $ForkRoot_W$, is equal to or greater than 1.0 mm and equal to or less than 3.0 mm, alternatively is equal to or greater than 1.5 mm and equal to or less than 2.5 mm, further alternatively is 2.0 mm.

Aspect 16: The antenna of any one of Aspects 12 to 15, wherein each of the first and second fork lengths, $Fork_{L1}$ and $Fork_{L2}$, are equal to or greater than 23.0 mm and equal to or less than 25.0 mm, alternatively are equal to or greater than 23.5 mm and equal to or less than 24.5 mm, or further alternatively is 24.0 mm; and wherein each of the first and second fork widths, $Fork_{L1}$ and $Fork_{L2}$, are equal to or greater than 0.5 mm and equal to or less than 2.5 mm, alternatively are equal to or greater than 1.0 mm and equal to or less than 2.0 mm, or further alternatively is 1.5 mm.

Aspect 17: The antenna of Aspects 12 to 16, wherein: the slot length, $Slot_L$, is equal to or greater than 20.0 mm and equal to or less than 22.0 mm, alternatively is equal to or greater than 20.5 mm and equal to or less than 21.5 mm, further alternatively is 21.0 mm; and the slot width is equal to or greater than 1.0 mm and equal to or less than 3.0 mm, alternatively is equal to or greater than 1.5 mm and equal to or less than 2.5 mm, further alternatively is 2.0 mm.

Aspect 18: The antenna of any one of Aspects 12 to 17, wherein the substrate includes a permittivity (ε) equal to or greater than 7 and equal to or less than 10, alternatively equal to or greater than 8 and equal to or less than 9, further alternatively equal to or greater than 8.6 and equal to or less than 8.8.

Aspect 19: The antenna of any one of Aspects 12 to 18, wherein the substrate includes a permeability (μ) equal to or greater than 0.5 and equal to or less than 3, alternatively equal to or greater than 1 and equal to or less than 2, further alternatively equal to or greater than 1.6 and equal to or less than 1.8.

Aspect 20: The antenna of any one of Aspects 12 to 19, wherein the substrate has a first loss tangent parameter (tan δ) equal to or greater than 0.0010 and equal to or less than 0.01, alternatively equal to or greater than 0.0015 and equal to or less than 0.009, further alternatively equal to or greater than 0.0020 and equal to or less than 0.0080.

Aspect 21: The antenna of Aspect 20, wherein the substrate has a second loss tangent parameter (tan μ) equal to or greater than 0.03 and equal to or less than 0.06, alternatively equal to or greater than 0.04 and equal to or less than 0.07, and further alternatively equal to or greater than 0.0429 to equal or less than 0.0771.

Aspect 22: The antenna of Aspect 11 wherein the substrate length, $Su_{bx}$, minus the root length, $ForkRoot_L$, is less than the slot length $Slot_L$. See, for example, FIGS. 12 to 14.

Aspect 23: The antenna of Aspects 22, wherein the slot extends beyond the first and second shoulders such that the slot end extends into the root. See, for example, FIGS. 12 to 14.

Aspect 24: The antenna of any one of Aspect 22 to 23 wherein the substrate length, $Sub_x$, is equal to or greater than 23.0 mm and equal to or less than 25.00 mm, alternatively equal to or greater than 23.5 mm and equal to or less than 24.5 mm, further alternatively equal to 24.00 mm; the substrate width, $Sub_y$, is equal to or greater than 5.0 mm and equal to or less than 7.00 mm, alternatively equal to or greater than 5.5 mm and equal to or less than 6.5 mm, further alternatively equal to 6.00 mm; and the substrate thickness, $Sub_z$, is equal to or greater than 2.0 mm and equal to or less than 4.00 mm, alternatively equal to or greater than 2.5 mm and equal to or less than 3.5 mm, further alternatively equal to 3.00 mm.

Aspect 25: The antenna of any one of Aspects 22 to 24, wherein the root length, $ForkRoot_L$, is equal to or greater than 5.0 mm and equal to or less than 7.00 mm, alternatively equal to or greater than 5.5 mm and equal to or less than 6.5 mm, further alternatively equal to 6.0 mm; and the root width, $ForkRoot_W$, is equal to or greater than 0.5 mm and equal to or less than 2.5 mm, alternatively equal to or greater than 1.0 mm and equal to or less than 2.0 mm, further alternatively equal to 1.5 mm.

Aspect 26: The antenna of any one of Aspects 22 to 25, wherein each of the first and second fork lengths, $Fork_{L1}$ and $Fork_{L2}$, is equal to or greater than 17.0 mm and equal to or less than 19.0 mm, alternatively is equal to or greater than 17.5 mm and equal to or less than 18.5 mm, and further alternatively is 18.0 mm; and each of the first and second fork widths, $Fork_{L1}$ and $Fork_{L2}$, is equal to or greater than 0.3 mm and equal to or greater than 2.0 mm, alternatively is equal to or greater than 0.8 mm and equal to or greater than 1.5 mm, and further alternatively is 1.0 mm.

Aspect 27: The antenna of any one of Aspects 22 to 26 wherein the slot length, $Slot_L$, is equal to or greater than 19.0 mm and is equal to or less than 21.0 mm, alternatively is equal to or greater than 19.5 mm and is equal to or less than 20.5 mm, and further alternatively is 20.0 mm; and the slot width, $Slot_X$, is equal to or greater than 0.5 mm and is equal to or less than 2.5 mm, alternatively is equal to or greater than 1.0 mm and is equal to or less than 2.0 mm, and further alternatively is 1.5 mm.

Aspect 28: The antenna of any one of Aspects 22 to 27, wherein the substrate includes a permittivity (ε) equal to or greater than 12.0 and equal to or less than 16.0, alternatively equal to or greater than 13.0 and equal to or less than 15.0, further alternatively equal to or greater than 13.9 and equal to or less than 14.1.

Aspect 29: The antenna of any one of Aspects 22 to 28, wherein the substrate includes a permeability (μ) equal to or greater than 0.5 and equal to or greater than 3.0, alternatively equal to or greater than 1.0 and equal to or less than 2.5, further alternatively equal to or greater than 1.8 and equal to or less than 2.0.

Aspect 30: The antenna of any one of Aspects 22 to 29, wherein the substrate has a first loss tangent parameter (tan δ) equal to or greater than 0.0020 and equal to or less than 0.01, alternatively equal to or greater than 0.0025 and equal to or less than 0.0095, further alternatively equal to or greater than 0.0030 and equal to or less than 0.0090.

Aspect 31: The antenna of any one of Aspects 30, wherein the substrate has a second loss tangent parameter (tan μ) equal to or greater than 0.015 and equal to or less than 0.065, alternatively equal to or greater than 0.02 and equal to or less than 0.06, and further alternatively equal to or greater than 0.0229 and equal to or less than 0.0571.

Aspect 32: The antenna of any one of Aspects 1 to 31, wherein the antenna is a patch antenna.

Aspect 33: The antenna of any one of Aspects 1 to 32, wherein the antenna is operational to produce an electromagnetic field having a linear polarization.

Aspect 34: An antenna assembly, comprising the antenna of any one of Aspects 1 to 33, and further comprising: a host board comprising a dielectric layer including an upper dielectric surface and a lower dielectric surface located opposite the upper dielectric surface, a top metal layer disposed on and bonded to a portion of the upper dielectric layer, and a bottom metal layer disposed on and bonded to the lower dielectric surface, wherein a region of the host board excluding the top metal layer defines an exposed portion of the dielectric layer. See, for example, FIGS. 6 to 13.

Aspect 35: The antenna assembly of any one of Aspect 34, wherein a first portion of the antenna is disposed on the top metal layer and a second portion of the antenna is disposed on the exposed portion of the dielectric layer.

Aspect 36: The antenna assembly of any one of Aspects 34 to 35, wherein the EM radiator is spaced apart from the host board by the substrate.

Aspect 37: The antenna assembly of any one of Aspects 34 to 36, wherein the host board extends along the first axis from a first board end to an opposing second board end to define a board length, $Grd_x$, extends along the second axis from a third board end to an opposing fourth board end to define a board width, $Grd_y$, and extends along the third axis from lower dielectric surface to lower dielectric surface to the first and second axes to define a board thickness, $Grd_z$.

Aspect 38: The antenna assembly of any one of Aspects 37, wherein the top metal layer extends along the first axis from a metal end to an opposing second metal end to define a metal surface length, GrdCprx.

Aspect 39: The antenna assembly of any one of Aspects 38, wherein the exposed portion of the dielectric layer extends along the first axis from the second metal end to the second board end to define a dielectric surface length, GrdInslx.

Aspect 40: The antenna assembly of Aspect 39, wherein the dielectric surface length, GrdInslx, is greater than the metal surface length, GrdCprx.

Aspect 41: The antenna assembly of any one of Aspects 37 to 40, further comprising an electrically conductive via extending through the root, the substrate, the top metal layer, and the bottom metal layer, the via configured to establish electrical conductivity between the antenna, the top metal layer and the bottom metal layer. See, for example, FIG. 7.

Aspect 42: The antenna assembly of Aspect 108, wherein the via has a circular profile defining a via diameter, Vial).

Aspect 43: The antenna assembly of any one of Aspects 41 to 42, wherein the via is arranged radially along the first axis and away from the first board end at a first via distance, $P_X$ and radially along the second axis and away from the third and fourth board ends at a second via distance, $P_Y$.

Aspect 44: The antenna assembly of Aspect 43, wherein the first via distance, $P_X$, is equal to or greater than 0.5 mm and equal to or less than 2.5 mm, alternatively is equal to or greater than 1.0 mm and equal to or less than 1.0 mm, and further alternatively is 1.5 mm; and the second via distance, $P_Y$, is equal to or greater than 3.5 mm and equal to or less than 5.5 mm, alternatively is equal to or greater than 4.0 mm, alternatively is equal to or greater than 4.0 mm and equal to or less than 5.0 mm, and further alternatively is 4.5 mm See, for example, FIG. 8.

Aspect 45: The antenna assembly of any one of Aspect 43, wherein the first via distance, $P_X$ is equal to or greater than 0.3 mm and equal to or less than 2.0 mm, alternatively is equal to or greater than 0.8 mm and equal to or less than 1.5 mm, and further alternatively is 1.0 mm; and the second via distance, $P_Y$, is equal to or greater than 2.0 mm and greater or less than 4.0 mm, alternatively is equal to or greater than 2.5 mm and equal to or less than 3.5 mm, an further alternatively is 3.0 mm.

Aspect 46: The antenna assembly of any one of Aspects 38 to 45, wherein the root is a first distance ($Root_x$) extending along the first axis (X-axis) away from the first board end, a second distance (Rooty) extending along the second axis (Y-axis) away from the second board end. See, for example, FIG. 10.

Aspect 47: The antenna assembly of Aspect 46, wherein the first distance ($Root_x$) is equal to or greater than 11.0 mm and equal to or less than 13.0 mm, alternatively is equal to or greater than 11.5 mm and equal to or less than 12.5 mm, and further alternatively is 12.0 mm; and the second distance ($Root_y$) is equal to or greater than 7.5 mm and equal to or less than 9.5 mm, alternatively is equal to or greater than 8.0 mm and equal to or less than 9.0 mm, and further alternatively is 8.5 mm.

Aspect 48: The antenna assembly of Aspect 46, wherein the first distance is equal to or greater than 12.5 mm and equal to or less than 14.5 mm, alternatively is equal to or greater than 13.0 mm and equal to or less than 14.0 mm, and further alternatively is 13.5 mm; and the second distance is equal to or greater than 9.0 mm and equal to or less than 11.0 mm, alternatively is equal to or greater than 9.5 mm and equal to or less than 10.5 mm, and further alternatively is 10.0 mm.

Aspect 49: The antenna assembly of any one of Aspects 35 to 48, wherein the antenna is operational in one or both of a first frequency range and a second frequency range different from the first frequency range.

Aspect 50: The antenna assembly of Aspect 49, wherein the first frequency range is equal to or greater than 1.5 gigahertz (GHz) and equal to or less than 3.8 GHZ, alternatively is equal to or greater than 2.0 GHz and equal to or less than 3.3 GHz, and further alternatively is equal to or greater than 2.300 GHz and equal to or less than 2.900 GHz.

Aspect 51: The antenna assembly of Aspect 50, wherein the second frequency range is equal to or greater than 4.0 GHz and equal to or less than 7.5 GHz, alternatively is equal to or greater than 4.5 GHz and equal to or less than 7.0 GHz, and further alternatively is equal to or greater than 5.0 GHZ and further alternatively is equal to or less than 6.5 GHz.

Aspect 52: The antenna assembly of any one of Aspects 48 to 51, wherein the first frequency range is equal to or greater than 1.5 GHz and equal to or less than 3.5 GHz, alternatively is equal to or greater than 2.0 GHz and equal to or less than 3.0 GHz, and further alternatively is equal to or greater than 2.26 gigahertz (GHz) and equal to or less than 2.70 GHz.

Aspect 53: The antenna assembly of Aspect 52, wherein the antenna is operational with a gain equal to or greater than 1.18 dBi.

Aspect 54: The antenna of any one of Aspects 52 to 53, wherein the antenna is operational with an efficiency equal to or greater than 70 percent (70%) and equal to or less than 90%, alternatively equal to or greater than 76% and equal to or less than 88%.

Aspect 55: The antenna assembly of any one of Aspects 49 to 51, wherein the first frequency range is equal to or greater than 2.0 gigahertz (GHz) and equal to or less than 3.0 GHz, alternatively is equal to or greater than 3.0 GHz and equal to or less than 2.8 GHz, and further alternatively is equal to or greater than 2.32 GHz and equal to or less than 2.75 GHz.

Aspect 56: The antenna assembly of Aspect 55, wherein the antenna is operational with a gain equal to or greater than 0.085 dBi.

Aspect 57: The antenna assembly of any one of Aspects 55 to 56, wherein the antenna is operational with an efficiency equal to or greater than 70 percent (70%) and equal to or less than 85%, and alternatively equal to or greater than 72% and equal to or less than 82%.

As used herein, the phrase "equal to about" is intended to account for manufacturing tolerances and/or insubstantial deviations from a nominal value that do not detract from a purpose disclosed herein and falling within a scope of the appended claims.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An antenna, comprising:

a substrate comprising a magnetodielectric material, the substrate extending from a first substrate end to an opposing second substrate end along the first axis to define a substrate length, Subx, and extending from a third substrate end to a fourth substrate end along the second axis to define a substrate width, Suby, and further extending from a lower substrate surface to an upper substrate surface along a third axis to define a substrate thickness, Subz; and an electromagnetic, EM, radiator comprising an electrically conductive material disposed on an upper surface of the substrate, the EM radiator including a root, and a pair of forks that are contiguous with and extend from the root along a first axis, the pair of forks being separated from one another by a slot in the electrically conductive material of the EM radiator to define a fork-shaped EM radiator, wherein the root includes a bridge portion extending between the pair of forks in a direction of a second axis perpendicular to the first axis to electrically connect together the pair of forks, the root further including a bottom root end that defines a bottom of the EM radiator, and a shoulder root end that includes first and second opposing shoulders of the root, wherein a distance between the bottom root end and the shoulder root end defining a root length, $ForkRoot_L$, and wherein the root extends along the second axis from a first root edge to an opposing second root edge to define a root width, $ForkRoot_W$, wherein the pair of forks comprises:

a first fork extending along the first axis from a first proximate end contacting the first shoulder to an opposing first distal end to define a first fork length, $Fork_{L1}$, and extending along the second axis from a first outer fork edge to a first inner fork edge to define a first fork width, $Fork_{W1}$; and a second fork spaced apart from the first fork along the second axis, the second fork extending along the first axis from a second proximate end contacting the second shoulder to an opposing second distal end to define a second fork length, $Fork_{L2}$, and extending along the second axis from a second outer fork edge to a second inner fork edge to define a second fork width, $Fork_{W2}$, wherein a distance extending along the second axis between the first and second inner fork edges defines a slot width, $Slot_W$, of the slot, and wherein the slot is formed between the first and second inner fork edges and extends along the first axis from a slot end proximate the bridge portion to an opposing slot opening between the first and second distal ends to define a slot length, $Slot_L$, and wherein the substrate length, Subx, minus the root length, $ForkRoot_L$, is less than the slot length $Slot_L$.

2. The antenna of claim 1, wherein the magnetodielectric material comprises a hexagonal ferrite material.

3. The antenna of claim 2, wherein the hexagonal ferrite material includes 18H-type hexaferrite.

4. The antenna of claim 1, wherein the substrate is a single layer comprising the magnetodielectric material.

5. The antenna of claim 1, wherein the substrate includes a plurality of layers, each of the layers comprising the magnetodielectric material.

6. The antenna of claim 1, wherein the root extends away from the first and second outer fork edges along the second axis to define the first and second shoulders.

7. The antenna of claim 1, wherein the slot extends beyond the first and second shoulders such that the slot end extends into the root.

8. An antenna assembly, comprising:

the antenna of claim 1, and further comprising:

a host board comprising a dielectric layer including an upper dielectric surface and a lower dielectric surface located opposite the upper dielectric surface, a top metal layer disposed on and bonded to a portion of the upper dielectric surface, and a bottom metal layer disposed on and bonded to the lower dielectric surface, wherein a region of the host board excluding the top metal layer defines an exposed portion of the dielectric layer.

9. The antenna assembly of claim 8, wherein a first portion of the antenna is disposed on the top metal layer and a second portion of the antenna is disposed on the exposed portion of the dielectric layer.

10. The antenna assembly of claim 9, wherein the antenna is operational in one or both of a first frequency range and a second frequency range different from the first frequency range.

11. The antenna assembly of claim 8, wherein the EM radiator is spaced apart from the host board by the substrate.

12. The antenna assembly of claim 8, wherein the host board extends along the first axis from a first board end to an opposing second board end to define a board length, Grdx, extends along the second axis from a third board end to an opposing fourth board end to define a board width, Grdy, and extends along the third axis from lower dielectric surface to lower dielectric surface to the first and second axes to define a board thickness, Grdz.

13. The antenna assembly of claim 12, wherein the top metal layer extends along the first axis from a metal end to an opposing second metal end to define a metal surface length, GrdCprx.

14. The antenna assembly of claim 13, wherein the exposed portion of the dielectric layer extends along the first axis from the second metal end to the second board end to define a dielectric surface length, Grdlnslx.

15. The antenna assembly of claim 14, wherein the dielectric surface length, Grdlnslx, is greater than the metal surface length, GrdCprx.

16. The antenna assembly of claim 13, further comprising an electrically conductive via extending through the root, the substrate, the top metal layer, and the bottom metal layer, the via configured to establish electrical conductivity between the antenna, the top metal layer and the bottom metal layer.

17. The antenna assembly of claim 13, wherein the root is a first distance ($Root_x$) extending along the first axis away from the first board end, a second distance ($Root_y$) extending along the second axis away from the second board end.

* * * * *